(12) United States Patent  
Bachelder et al.

(10) Patent No.: US 8,040,361 B2  
(45) Date of Patent: Oct. 18, 2011

(54) SYSTEMS AND METHODS FOR COMBINING VIRTUAL AND REAL-TIME PHYSICAL ENVIRONMENTS

(75) Inventors: Edward N. Bachelder, Redondo Beach, CA (US); Noah Brickman, Ben Lomond, CA (US)

(73) Assignee: Systems Technology, Inc., Hawthorne, CA (US)

( * ) Notice: Subject to any disclaimer, the term of this patent is extended or adjusted under 35 U.S.C. 154(b) by 201 days.

(21) Appl. No.: 12/321,329

(22) Filed: Jan. 20, 2009

(65) Prior Publication Data

US 2010/0245387 A1    Sep. 30, 2010

(51) Int. Cl.  
    *G09G 5/00* (2006.01)
(52) U.S. Cl. ......................... 345/633; 345/592
(58) Field of Classification Search .................. 345/632, 345/633, 634  
    See application file for complete search history.

(56) References Cited

U.S. PATENT DOCUMENTS

| | | | | |
|---|---|---|---|---|
| 4,667,221 A * | 5/1987 | Cawley et al. | ................ | 348/587 |
| 5,381,184 A * | 1/1995 | Gehrmann | .................... | 348/586 |
| 5,400,081 A * | 3/1995 | Chaplin | ........................ | 348/587 |
| 5,696,892 A * | 12/1997 | Redmann et al. | ............. | 345/582 |
| 5,708,479 A * | 1/1998 | Gehrmann | ..................... | 348/587 |
| 5,774,191 A * | 6/1998 | Iverson | .......................... | 348/592 |
| 7,508,455 B2 * | 3/2009 | Liu et al. | ........................ | 348/587 |
| 2005/0099603 A1* | 5/2005 | Thomas et al. | .................. | 352/85 |
| 2007/0109314 A1* | 5/2007 | Chiu et al. | ..................... | 345/592 |
| 2007/0216811 A1* | 9/2007 | Oh et al. | ....................... | 348/592 |

* cited by examiner

*Primary Examiner* — M Good Johnson  
(74) *Attorney, Agent, or Firm* — Lewis Brisbois Bisgaard & Smith LLP

(57) ABSTRACT

Systems, methods and structures for combining virtual reality and real-time environment by combining captured real-time video data and real-time 3D environment renderings to create a fused, that is, combined environment, including capturing video imagery in RGB or HSV/HSV color coordinate systems and processing it to determine which areas should be made transparent, or have other color modifications made, based on sensed cultural features, electromagnetic spectrum values, and/or sensor line-of-sight, wherein the sensed features can also include electromagnetic radiation characteristics such as color, infra-red, ultra-violet light values, cultural features can include patterns of these characteristics, such as object recognition using edge detection, and whereby the processed image is then overlaid on, and fused into a 3D environment to combine the two data sources into a single scene to thereby create an effect whereby a user can look through predesignated areas or "windows" in the video image to see into a 3D simulated world, and/or see other enhanced or reprocessed features of the captured image.

20 Claims, 25 Drawing Sheets  
(9 of 25 Drawing Sheet(s) Filed in Color)

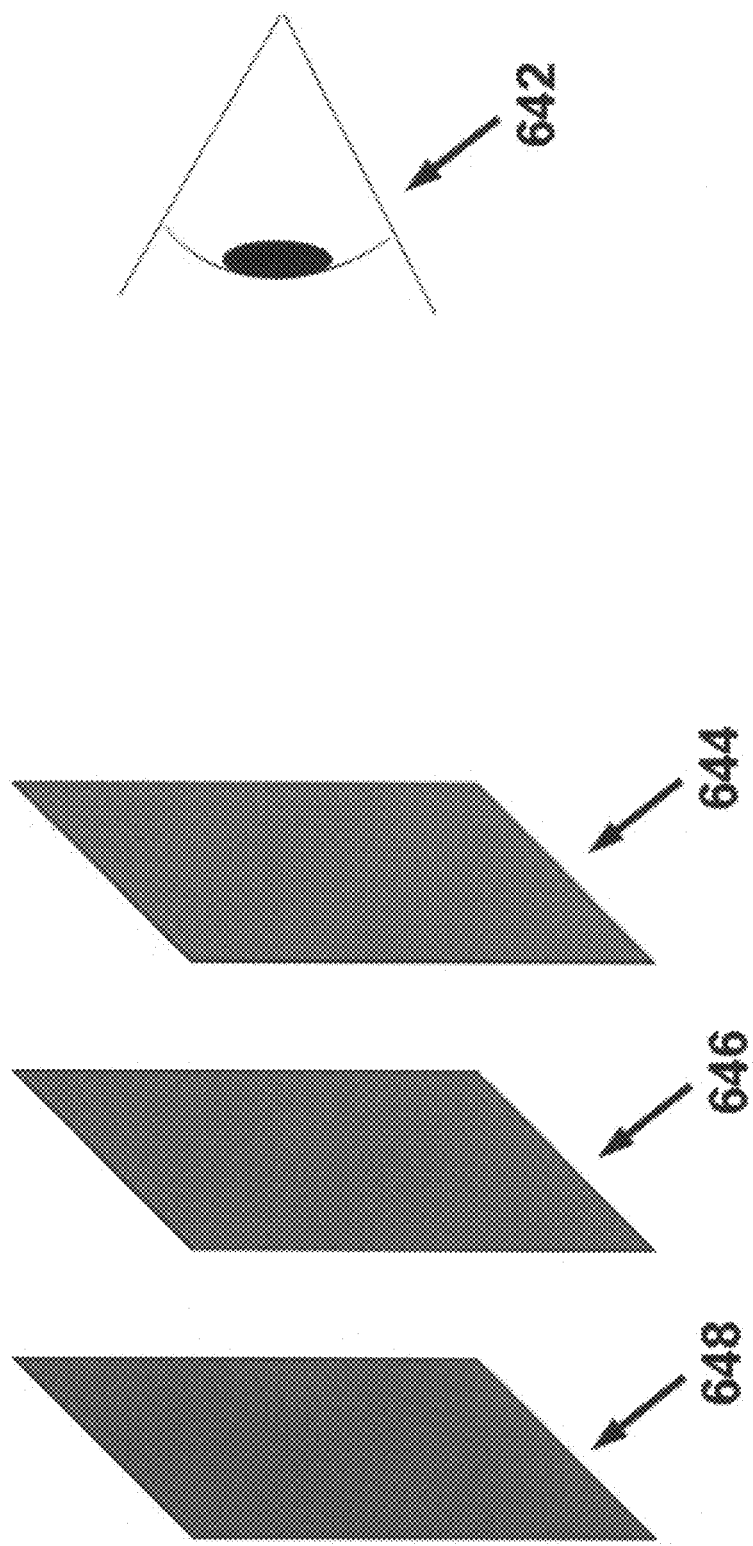

SYSTEMS AND METHODS FOR COMBINING VIRTUAL AND REAL-TIME PHYSICAL ENVIRONMENTS

REFERENCE TO RELATED APPLICATION

This application claims the benefit of U.S. application for patent Ser. No. 11/104,379, filed Apr. 11, 2005, which is incorporated by reference herein.

FIELD OF INVENTION

The present invention relates to the field of virtual reality (VR).

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all rights whatsoever.

BACKGROUND OF INVENTION

As the power and speed of computers has grown, so has the ability to provide computer-generated artificial and virtual environments. Such virtual environments have proven popular for training systems, such as for driver training, pilot training and even training in performing delicate medical and surgical procedures. These systems typically involve combining prerecorded or computer generated visual information with a real world environment to provide the perception of a desired environment. For example, a driver's training simulator may include a physical representation of the driver's seat of an automobile with a video or computer generated image of a road and traffic projected on what would be the windshield of the simulator car of a student driver. The image is made to be reactive to the actions of the driver, by changing speeds and perspectives in response to acceleration, braking and steering by the driver. Similarly, sophisticated flight simulators include a physical cockpit and projected flight environments that present real world situations to the pilot via a display.

In some cases, a virtual reality is projected in front of the eyes of a user via a virtual reality helmet, goggles, or other input device, so that the only image seen by the user is the virtual image. In other instances, mirrors and partially reflective materials are used so that a user can view both the real world environment and the virtual environment at the same time.

A disadvantage of prior art virtual reality and simulation systems is difficulty in combining real world and virtual world images in a realistic and unrestricted manner. In some prior art cases, certain views and angles are not available to a user because they require prior calculation of image perspective and cannot be processed in real time. In other instances, the ability to interact with the virtual world with physical objects is limited or unavailable.

SUMMARY OF INVENTION

The present systems include methods, devices, structures and circuits for combining virtual reality and real-time environment. Embodiments of the systems combine captured real-time video data and real-time 3D environment rendering(s) to create a fused, that is, a combined environment or reality. These systems capture video imagery and process it to determine which areas should be made transparent, or have other color modifications made, based on sensed cultural features and/or sensor line-of-sight. Sensed features can include electromagnetic radiation characteristics, e.g., visible color, infra-red intensity or ultra-violet intensity. Cultural features can include patterns of these characteristics, such as object recognition using edge detection, depth sensing using stereoscopy or laser range-finding. This processed image is then overlaid on a three-dimensional (3D) environment to combine the data sources into a single scene or image that is then available for viewing by the system's user. This creates an effect by which a user can look through predefined or pre-determined areas, or "windows" in the video image and then see into a 3D simulated world or environment, and/or see other enhanced or reprocessed features of the captured image.

Methods of deploying near-field images into the far-field virtual space are also described and included as preferred embodiments. In one preferred embodiment, a depth sensing method, such as with use of a laser range finder, video pixels corresponding to various depths in the environment are placed and rendered in a virtual environment consistent with the sensed depths of the pixels, and virtual objects are then placed between, in front of, or beyond the video-based objects. Alternatively, the video-based and virtual objects could be moved within the virtual environment as a consequence or function of user interaction, such as with a joystick or through voice commands. Additionally, the predetermined area, or portals where the virtual scene is placed can be designated via depth. For example, an actual window could be cut out of a wall, and a background surface could be placed at, e.g., 10 feet or some other distance behind the cut out in the wall. In such an example, the virtual scene would then replace every pixel that lies beyond some threshold, predetermined distance behind the cut out in the wall.

In another aspect, when a physical object of interest is isolated from the surrounding environment, by, for example, framing it with a keying color, sensing its depth, or using object recognition, it can be physically manipulated by the user and commanded to move into the environment and at a chosen or predetermined distance. At a predetermined distance, the isolated video is mounted onto a virtual billboard, which is then deployed in the virtual environment. If the user chooses to physically retrieve the object, the video is removed from the virtual billboard when it reaches the distance where the physical object is actually located, at which point the user proceeds to maneuver and manipulate the physical object in near-space. In this manner, realistic manipulations of real objects can be made at relatively great distances, but without requiring large physical spaces for the system.

These and other embodiments, features, aspects, and advantages of the presently described systems will become better understood with regard to the following description, appended claims and accompanying drawings.

BRIEF DESCRIPTION OF THE DRAWINGS

The patent or application file contains at least one drawing executed in color. Copies of this patent or patent application publication with color drawing(s) will be provided by the Patent Office upon request and payment of the necessary fee.

The foregoing aspects and the attendant advantages of the present invention will become more readily appreciated by reference to the following detailed description, when taken in conjunction with the accompanying drawings, wherein:

FIG. 14 is a schematic diagram of the layering hierarchy for the FIG. 8 embodiment;

Figure 1:
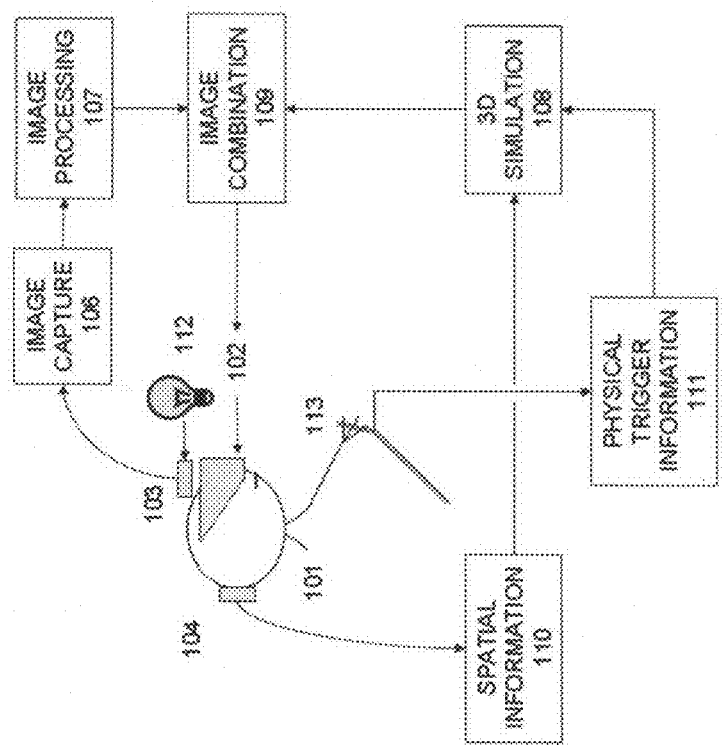
FIG. 1 is a schematic illustration of a preferred system embodiment.

Reference symbols or names are used in the Figures to indicate certain components, aspects or features shown therein. Reference symbols common to more than one Figure indicate like components, aspects or features shown therein.

DETAILED DESCRIPTION

Described herein are several embodiments of systems that include methods and apparatus for combining virtual reality and real-time environments. In the following description, numerous specific details are set forth to provide a more thorough description of these embodiments. It is apparent, however, to one skilled in the art that the systems need not include, and may be used without these specific details. In other instances, well known features have not been described in detail so as not to obscure the inventive features of the system.

One prior art technique for combining two environments is a movie special effect known as "blue screen" or "green screen" technology. In this technique, an actor is filmed in front of a blue screen and can move or react to some imagined scenario. Subsequently, the film may be filtered so that everything blue is removed, leaving only the actor moving about. The actor's image can then be combined with some desired background or environment so that it looks like the actor is actually in some desired location. This technique is often used in filming scenes involving driving. Actors are filmed in a replica of a car in front of a blue screen. Some movement (for example, shaking) is provided to simulate driving over a road surface and the driver might even turn the wheel as if turning the car. In reality, of course, the car does not move at all. Next, the scene of the drivers is combined with footage taken by cameramen in a real car on the road on which the actors are pretending to drive. The result gives the perception that the actors are actually driving a car on the road. This process is also referred to as chroma-key.

Typically, motion picture chroma-key shots are done in several steps over time, making the system inapplicable for real time virtual environments. However, some chroma-key processes are used in real time in certain video and television applications. For example, a television weatherman is typically shot live in front of a chroma-key matte, such as a blue screen or green screen. The weatherman's image (with the matte color filtered out) is combined with an image from another source, such as the weather map or satellite picture, with which the weatherman appears to interact. In reality, the weatherman is watching a monitor with the weather map image on it and uses that to point at portions of the blue screen which would correspond to the weather map. Such an application is very limited and doesn't permit realistic interaction on the part of the human involved with the virtual image.

The present inventive system permits, a user, to see and work with physical objects at close range (near field) and to have these objects transition to virtual images or computer-transformed video as they move to a threshold distance away from the user, and beyond that distance (far field). The system also provides a field of view visual system by using motion cueing systems to account for user position and orientation. The system uses live video capture, real-time video editing, and virtual environment simulation.

System

One preferred embodiment of the inventive system comprises cameras, processors, image generators, position detectors, displays, physical objects, and a physical space. FIG. 1 illustrates one embodiment of the system of the present invention. A user 101 is equipped with a head mounted display (HMD) 102. Atop the HMD 102 is mounted a camera 103 for receiving the actual physical image 112 viewed by the user 101. The camera may alternatively be integrated with the HMD or not, but is mounted at some location where the camera 103 at least approximately has the same view as the user's eyes. The user 101 is equipped with a head tracker 104 which provides 3D spatial information about the location and attitude of the head of the user 101. The head tracker is used to permit proper perspective and viewing angle of the virtually generated portions of the display image on the HMD 102.

The user 101 can interact with physical objects in the environment. In FIG. 1, the user 101 is shown interacting with a control handle 113. Some physical objects may be used to represent real world counterparts, such as accelerators, steering mechanisms, firing devices, etc.

The output of the camera 103 is provided to a conventional image capture device, represented by block 106 and then to a conventional image processing device or circuit, represented by block 107. The purpose of the image processor 107 is to identify all areas of a real video image that should be transmitted through to the HMD 102 and which areas are to be overlaid with virtual imagery.

Head tracker 104 is coupled to spatial information algorithm, device or circuit, represented by block 110 where the location and attitude of the user's head is derived. This information is provided to a conventional 3D simulation algorithm, device or circuit, represented by block 108 which generates a possible 3D image based on the location of user 101 and the line of sight of user 101. Any input from physical devices is provided to conventional physical trigger information algorithm, device or circuit, represented by block 111 and then to a conventional 3D simulation processor, represented by block 108. Trigger block 111 is used to indicate any changes that should be made to the generated virtual image based on manipulation of physical objects by user 101. The output of 3D simulation block 108 is provided, along with the output of image processing block 107, to a conventional image combination algorithm, device or circuit, represented by block 109. The virtual image is overlaid with the real image via a masking process so that the virtual image is only visible in desired areas of the frame. This combined image is provided to the user via the HMD 102 and it is this combined image that the user 101 views.

Environment

Figure 2:
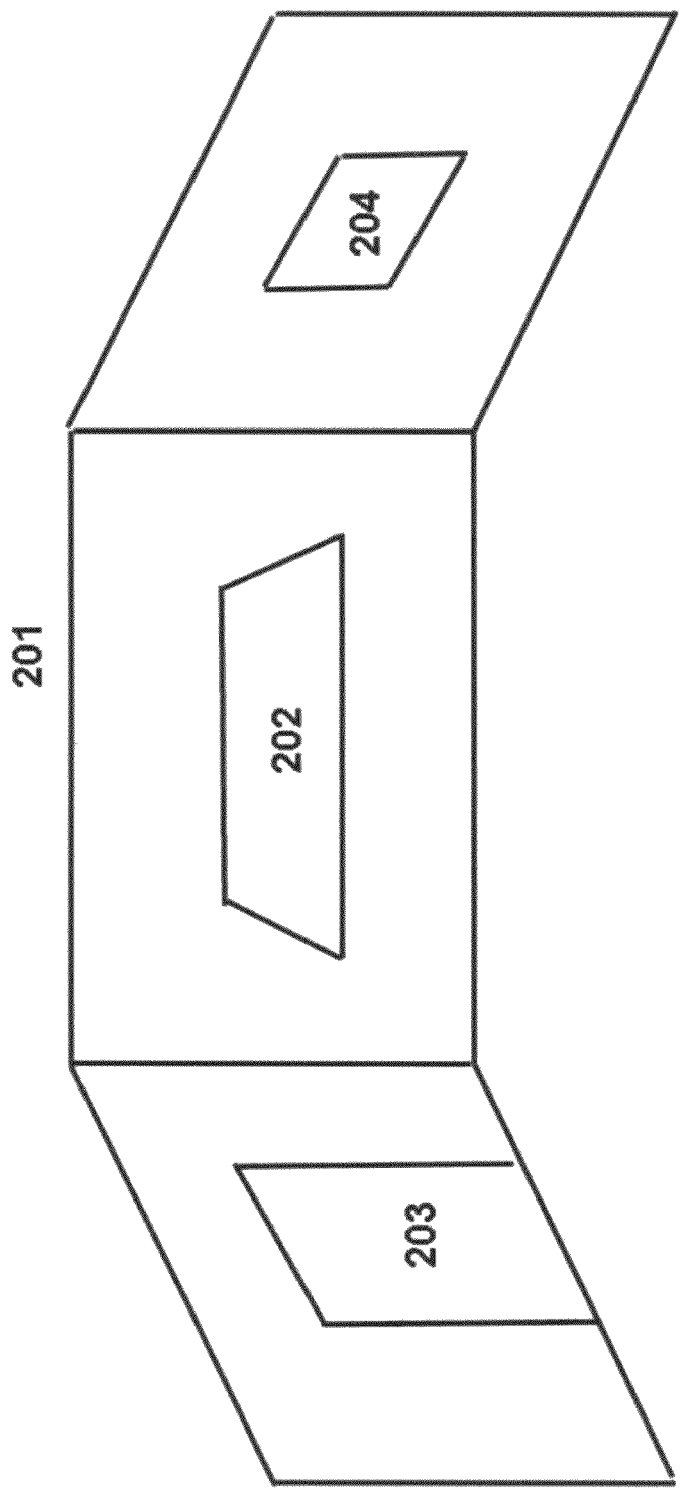
FIG. 2 is a schematic illustration of an example environment for use in the FIG. 1 embodiment.

One preferred embodiment of the systems is used in a combination physical/virtual environment. The physical environment may vary from application to application, depending on the desired end use. By way of example, consider the inside of a vehicle, such as a helicopter, truck, boat, etc. FIG. 2 illustrates a partial view of an interior with a combination of physical and virtual regions defined. Referring to FIG. 2, a wall 201 is shown with a windshield 202, a door 203 and window 204 defined in the wall (virtual world). This might represent the interior of a helicopter, personnel carrier, boat, or some other environment. The virtual spaces 202-204 are represented in this embodiment by the application of a specific electromagnetic threshold, such as magenta. In one embodiment, the defined virtual surfaces 202-204 are flat surfaces painted the desired electromagnetic spectrum (e.g., color). In another embodiment, the areas 202-204 are openings in wall 201, backed with shallow dishes painted the desired color. In such an embodiment, the user 101 can actually extend himself and physical objects seemingly beyond the boundaries of the defined environment.

Image Generation

Figure 3:
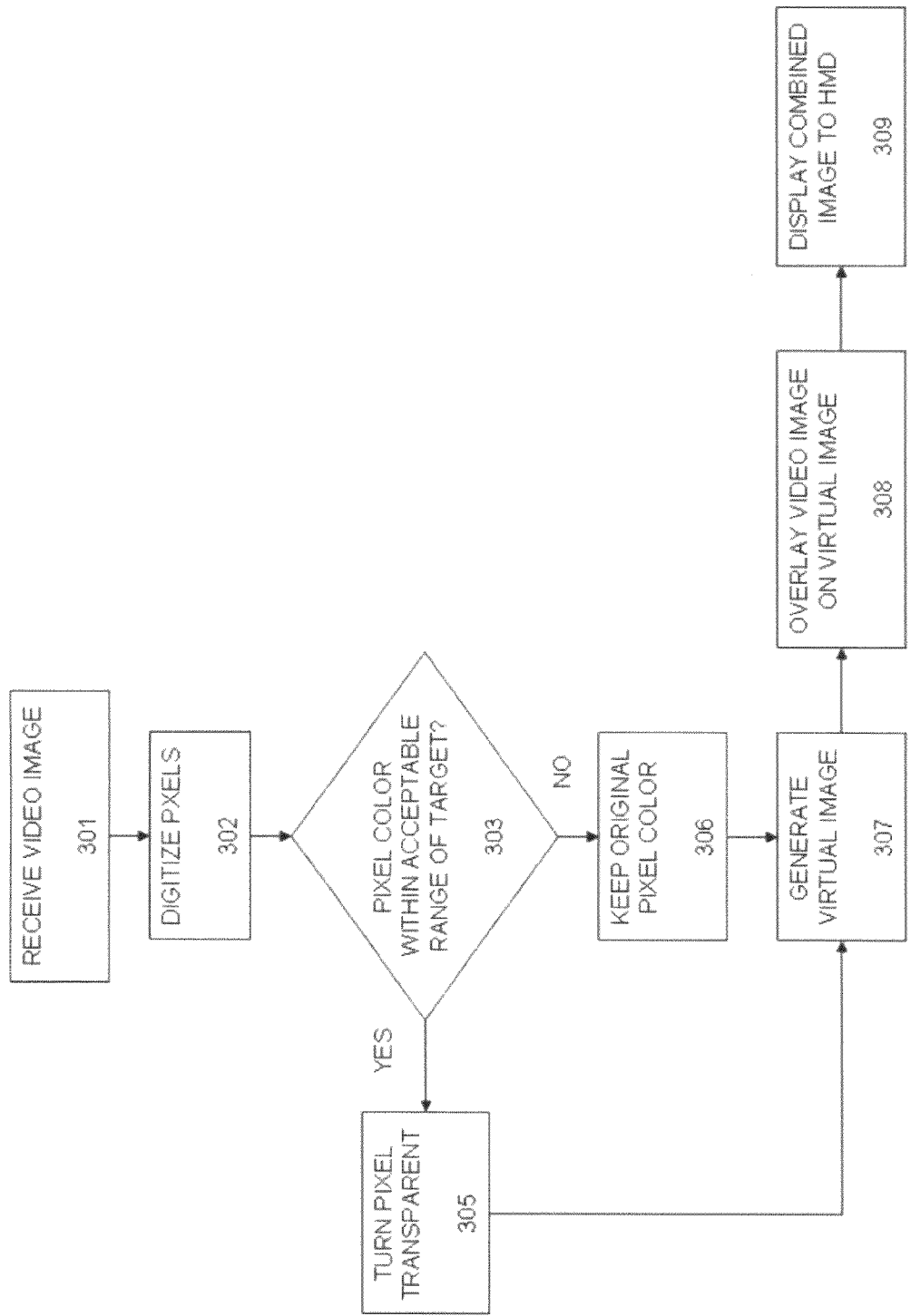
FIG. 3 is a flow chart illustrating a preferred operation of the FIG. 1 embodiment.

The system of FIG. 1, when used with an environment such as is shown in FIG. 2, provides an environment that is a combination of real and virtual images. FIG. 3 is a flow chart describing how image combination and generation takes place. At step 301, the camera 103 receives a video frame. At step 302 the frame is digitized to yield a frame buffer of digital value pixels. Alternatively the camera could be a digital camera that captures the image as digital pixels. The pixels are stored with attributes including color and intensity. For example, the pixels may be stored as 32 bit values with eight bit red, green, and blue values along with an eight bit alpha value (RGB).

At step 303 the color of each pixel is compared to a target masking color. In one preferred embodiment, the target value or color is magenta. Magenta is preferred because it is an atypical color in most environments and has relatively high selectability in different light conditions. The goal is to render a frame mask that makes each pixel that matches the target color to be transparent. If the target color is matched by the pixel under review, the pixel is turned transparent at step 305. If no, the original color of the pixel is maintained at step 306. This decision process is performed for each pixel in each frame.

At step 307 the virtual image is generated based on the current state of the environment and other factors described below. At step 308 the video image (with matching pixels rendered transparent) is overlaid onto the virtual image. The combined image will show the actual video except where the pixels have been turned transparent. At those locations the virtual image will be seen. At step 309 this combined image is provided to the HMD and the user sees a combination of real and virtual images.

Figure 4B:
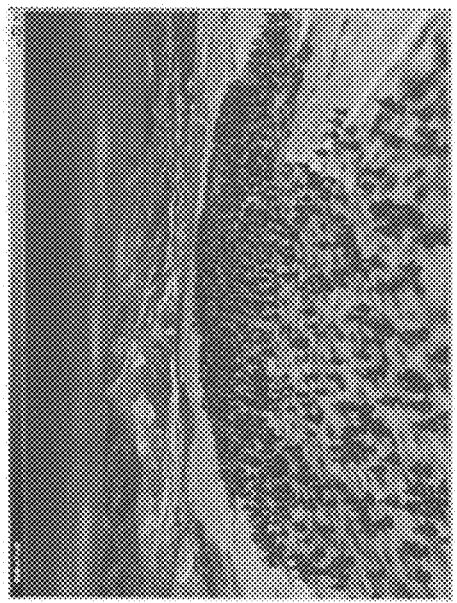
FIGS. 4A-4C are images that illustrate an image combination using an embodiment of the present system.
Figure 4C:
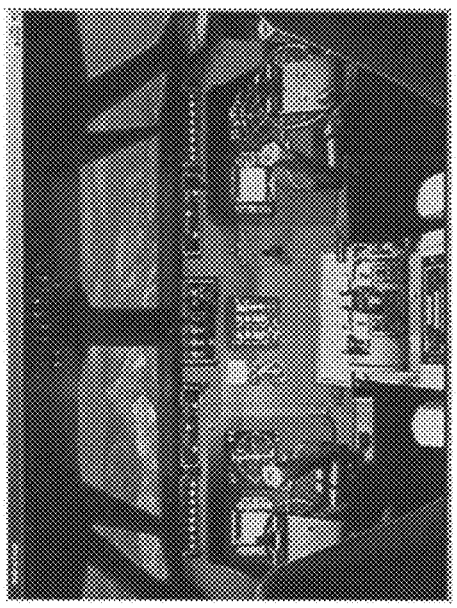
Figure 4A:
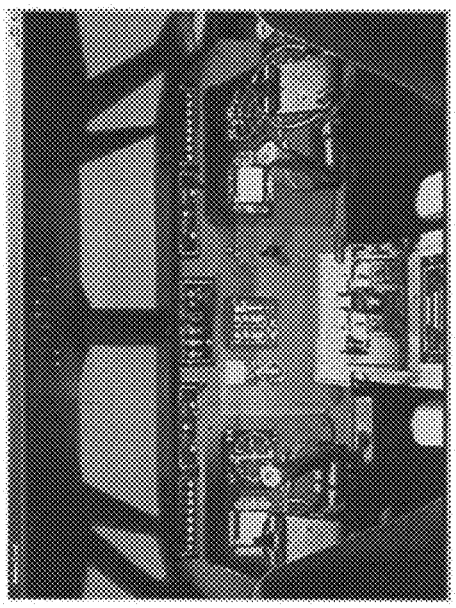

FIGS. 4A-4C illustrate an example of the operation of an embodiment of the system. FIG. 4A shows an actual cockpit with the windows painted magenta (or some other suitable target color). FIG. 4B shows a virtual environment. When the magenta portions of the cockpit are rendered transparent and overlaid over the virtual image of FIG. 4B, the resulting combined image is shown in FIG. 4C. As can be seen in FIG. 4C, only those portions of the virtual image corresponding to the transparent pixels are shown in the combined image. The rest of the virtual image is masked by the unchanged pixels of the real video image.

In an alternate embodiment, rather than specify the color range of the pixels that will be made transparent, i.e. the background color, the color range of the pixels that will be preserved will be specified—all other pixels would be rendered transparent and replaced with the virtual environment. For instance, green could be designated as the color that will be preserved. Thus a trainee's flight suit and flight gloves would be displayed as a real-time image that the trainee observes. Interactive hardware that is physically touched, such as a gun, litter, or hoist, that is painted a green would similarly be displayed, as would the trainee's boots if they are sprayed with, for example, a non-permanent coating of green. The rest of the environment could be virtual, consisting mainly of texture maps of the cabin interior and hardware that will not be touched by the viewer.

Training of Color Recognition

One aspect of the system that relates to the use of a target color in an RGB system as a filter for combining images concerns a problem related to accurate tracking of the color in a variety of dynamically changing lighting conditions. The color magenta may not appear to be a color within the threshold range of recognition in different lighting conditions. For example, the magenta background may appear closer to white in extremely bright lighting and closer to black in low light conditions. If the target color and zones are not recognized accurately, the image combination will not look realistic.

Another embodiment of the system implements a camera with a user-controlled exposure setting to address this problem. Many micro cameras only offer auto-exposure, as a cost and space-saving feature, whereby the camera self-adjusts to the sensed light intensity in its field-of-view. This automatically changes the color settings of all viewed objects so as to maximize overall contrast. However, such designs do not allow tight tolerances to be set for the color that is to be filtered in the system, such as, for example, magenta. Using auto-exposure, tolerances would have to be low enough to accommodate for changes in environmental lighting and reflected object brightness, but this could allow unintended colors in the video image to be filtered, or conversely, fail to be filtered when desired. By selecting and fixing the camera exposure level, the color of objects in the video image would remain constant for a given lighting level. In another embodiment and to further ensure that the portal surface color to be filtered remains constant, the portal surface color could be made to emit its own light instead of relying on reflected light.

Figure 6:
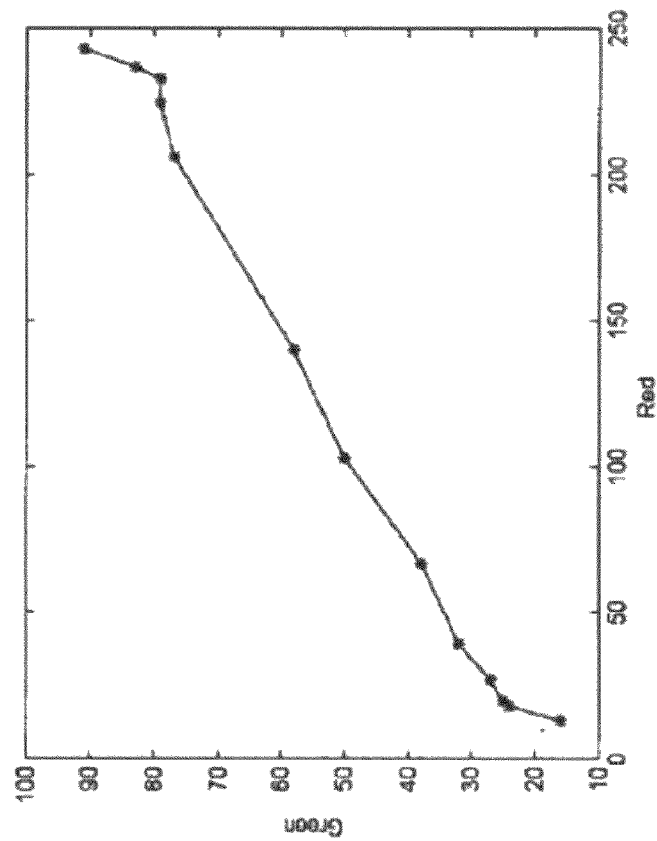
FIG. 6 illustrates RBG intensity values of green versus red for a target color at different lighting conditions.
Figure 5:
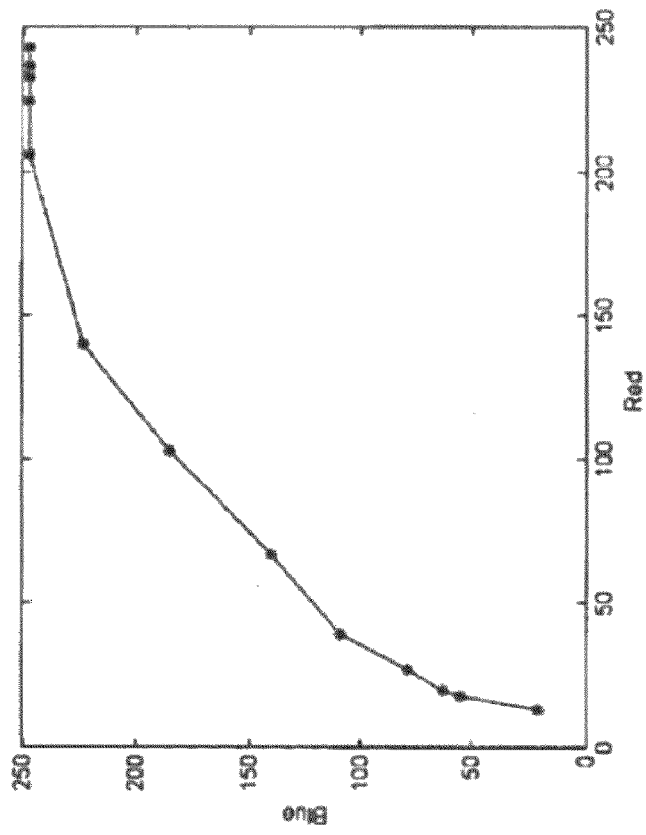
FIG. 5 illustrates RGB intensity values of blue versus red for a target color at different lighting conditions.

Yet another solution to target color recognition is to train the system in a variety of lighting conditions so that accurate pixel masking may result. In attempts to produce this, light intensity reaching a magenta panel is varied by changing the distance between a light bulb and the panel. The camera is trained on the magenta panel while in the auto-exposure mode, and for each new distance the RGB components registered by the camera are recorded—in effect generating an RGB map for varying light intensities. FIGS. 5-6 show the resulting profiles of Green and Blue as functions of Red intensity. Any measured value of Red that the camera registers can be checked against the corresponding Green and Blue values that the profiles predict. A match results if the predicted and measured values fall within a predetermined range of each other.

With the adaptive color recognition in place, the camera can be in auto-exposure mode, where the picture gain is automatically increased or lowered, that is, made brighter or darker, as the camera attempts to keep the overall picture brightness constant. This is a feature available in most if not all video cameras. Consequently, the present system is not limited to more expensive cameras that include manual exposure or fixed exposure. Instead, nearly any simple web cam, which can measure as little as 1" in length, can be used, reducing cost and complexity of the system while increasing its robustness to variability.

Pixel Masking

Figure 7:
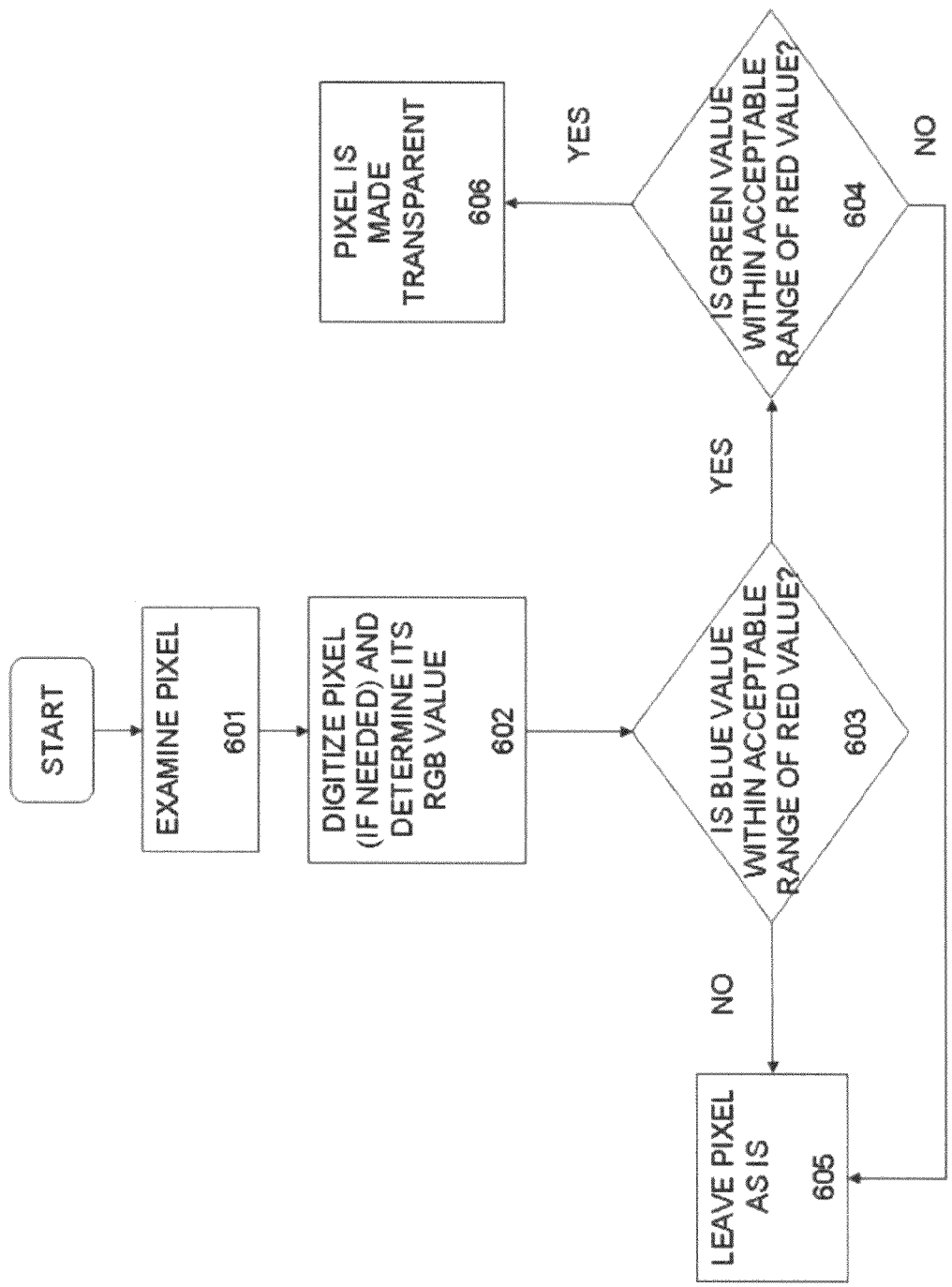
FIG. 7 is a flow diagram illustrating operation of an embodiment of the present systems in recognizing pixel color for masking.

FIG. 7 is a flow diagram illustrating operation of an embodiment of the present systems in recognizing pixel color for masking. At step 601 a pixel is examined. At step 602 the pixel is digitized, if necessary, and the RGB values are determined. If there is a measurable red component, it is compared to the intensity graphs of FIGS. 5 and 6. At step 603 it is determined if the blue value is within an acceptable range for the corresponding red value. If so, the system proceeds to step 604. If not, the system leaves the pixel as is at step 605.

At step 604 it is determined if the green value is within the acceptable range for the corresponding red value. If so, then the pixel is considered to be the target color and is made transparent at step 606. If not, the pixel is left as is at step 605.

Near-Field to Far-Field Transitions and Vice Versa

One advantage of the present systems and methods is that they allow a user to observe and physically interact with the near-space environment or domain while the simulated far-space domain is seamlessly interwoven into the visual scene. Additionally, these techniques enable a user to physically hold an object, release and send it into the far-space environment, such as a litter lowered from a helicopter cabin toward the simulated water below, perform tasks that affect that object, which is now part of simulated far-space, and retrieve and physically grasp the object once again as it returns to the near-space domain.

Current virtual reality (VR) graphics techniques distort perspective in near-space environments and for that reason they do not provide the capability to effectively combine near- and far-field images in a way to permit effective interaction between these environments with physical as well as simulated objects. Specifically, conventional VR systems have distorted representations of objects that are relatively close to the observer, e.g., closer than arm's length, because they distort perspective at these distances. For the VR user to perform basic manual tasks such as gunnery, the digits of the hands would have to be tracked—not just the fingertips, but also the joints and hands. Where speed and dexterity are required for complex manual tasks, such as removing a gun barrel, it is believed that conventional VR would not be feasible due to masking, sensor lag, and component simulation fidelity issues. Furthermore, with regard to design of conventional VR systems, the far-space environment that is projected onto screens is clearly distinguishable from the near-space environment that includes, for example, cockpit controls, hands, etc., which detracts from realism. It is believed that this delineation between environments can arise from: screen distortion effects, seaming and blank space between screens that are intended to connect continuously, low screen resolution, screen reflection, etc. In contrast the present systems and methods convert both the near and far-space into bitmaps, so that the visual quality of the two environments is much more consistent than in conventional VR technology.

To accomplish an effective transition and realistic presentation of near-field to far-field images, the present systems and methods use images of the actual physical device being used in the simulation. For example, consider when the simulation is a helicopter, and the device to be used in near-field and far-field is a stretcher on a winch. One task for a user of the system is to maneuver the stretcher out of a door of the helicopter and lower it below to a downed pilot or to a person stranded in an otherwise inaccessible location to train for a rescue operation.

In such an example, the stretcher is lowered from the helicopter with a winch that is located and operated within the helicopter cabin. The aircrew user(s) would not make physical contact with the stretcher when the winch is in operation. Rather than build an actual replica of the stretcher and place it outside the cabin, texture maps of the stretcher's image taken at different perspectives, for example, eight perspectives ranging from a direct side view to looking straight down from on top, could be used. These photos or images would initially be taken with a colored backdrop and later processed in accordance with the description herein so that only the pixels belonging to the hardware remained, that is, the backdrop color pixels would have been removed. These eight texture maps would then be assembled into a mesh using conventional techniques, similar to putting together a box. The resulting 3D texture map mesh would provide the user extremely realistic perspectives of the stretcher-winch-line assembly as the stretcher (mesh) is virtually lowered from the cabin to the water below. The winch and cable could be actual hardware, because the aircrew must physically interact with both. The stretcher texture map translation is preferably slaved to the winch's actual rotation in accordance with the description herein and conventional techniques.

To accomplish an effective transition and realistic presentation of near-field to far-field images, the present systems may also use real-time bitmaps of the object(s) that are being deployed into and/or retrieved from virtual space. In this technique each object to be deployed is identified and isolated by the computer, and the image's bitmap is attached to a virtual billboard. This billboard can then be translated and rotated within the virtual simulated environment, and can be occluded from view by other virtual objects when it is moved behind them. Thus, a person can be placed inside a stretcher and physically lowered a short distance, after which the image of both the stretcher and person could be attached to a virtual billboard. This billboard then reacts virtually to the hoist operator commands, that is, it is lowered and raised while the operator views the real-time, physical movements of the stretcher, e.g., swaying and twisting, and of the person inside, e.g., waving.

The object to be deployed can be identified and isolated by the computer using a variety of methods including: (1) user head position and orientation; (2) object position and orientation; (3) edge detection and object recognition; (4) depth ranging; or (5) framing the object with a keying background color, or the object being completely framed in darkness if using brightness keying.

The near-field/far-field transition capabilities of the present systems and methods permit a range of training exercises and manipulations that would not be possible in a traditional VR system. With weapons, for example, a user can hold a physical weapon in his hands in the near-field. Use of the trigger activates bullets or other projectiles that would appear only in the far-field.

Figure 8:
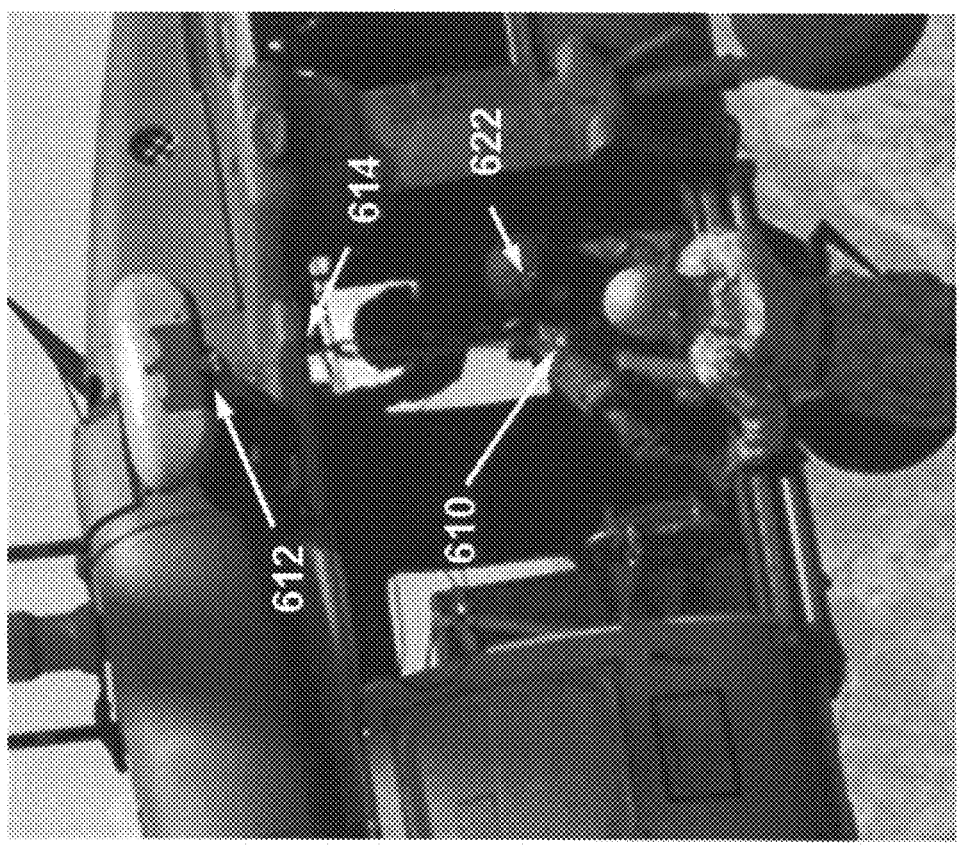
FIG. 8 is an image illustrating the preferred locations for several components of an alternate embodiment of the present systems and methods.
Figure 9:
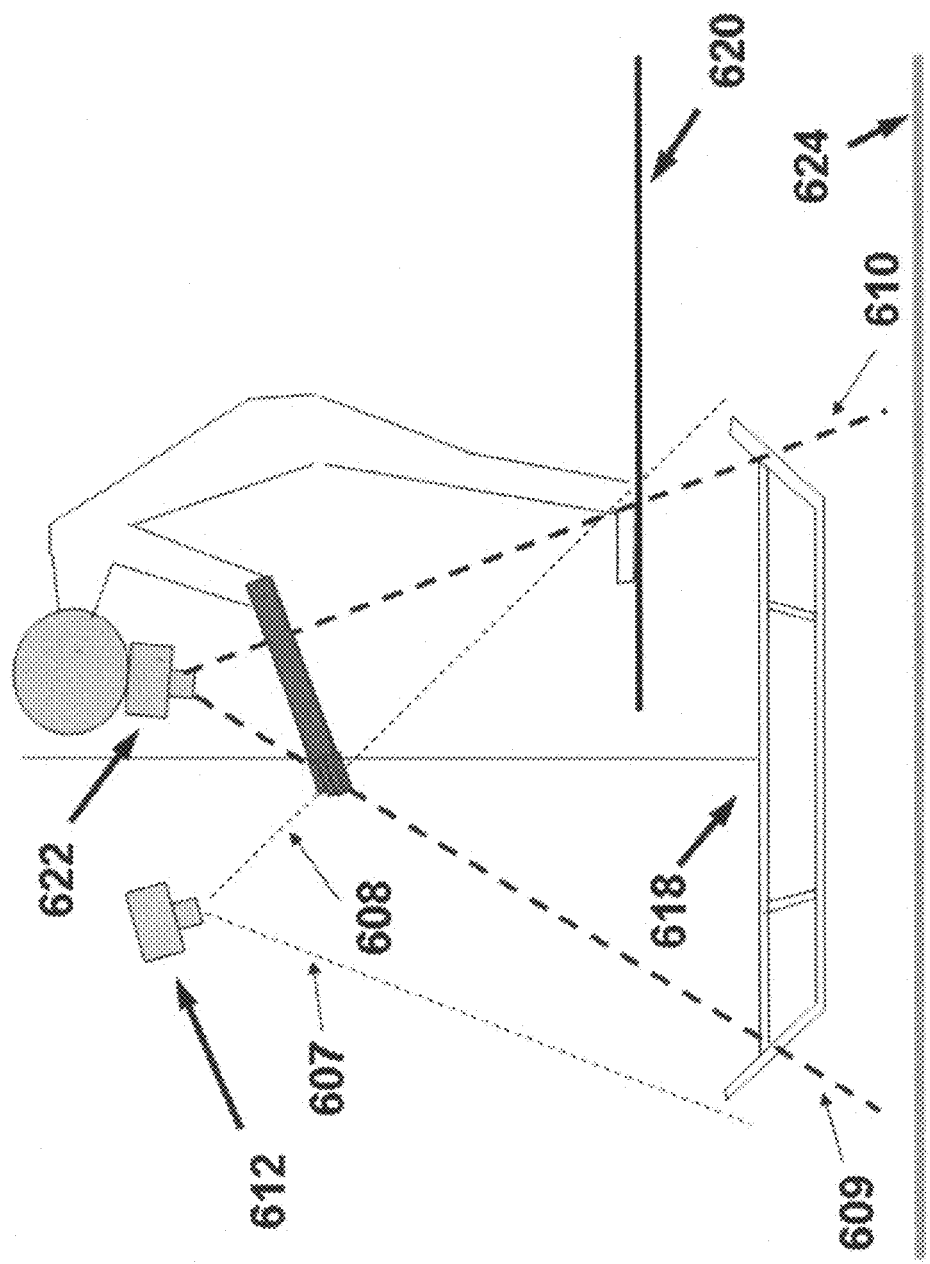
FIG. 9 is a schematic drawing illustrating a preferred component geometry for the FIG. 8 embodiment.

Another example of the near-field/far-field transition is given in the following aircraft rescue hoist example. FIG. 8 is an image of a helicopter and shows the location of the hoist hook attach point at 610. A camera is preferably fixed to the airframe frame at location shown at 612, and a conventional ultrasound tracker is preferably placed adjacent to the hook, shown at 614. The concept and user-component spatial relationships that are preferably employed for the hoist simulation are shown in FIG. 9. The fixed camera 612 provides a stable view of the rescue litter 618 after it has been physically lowered below the cabin deck 620. It should be noted that more than one fixed camera can be used to proved a positionally anchored view of the litter. The images of multiple cameras can be tiled to one another and the sub-area of the composite picture selected as a function of the user's head position and attitude. This can enable a very wide field of view of the physical object(s) that will be virtually moved. If the user's HMD camera 622 was used to isolate the rescue litter, clipping of the litter could occur as the user moved his head relative to the litter 618. For instance, the HMD camera's field-of-view is given by the angle extending between dashed lines 609 and 610. If this image is pasted to the virtual billboard, as the billboard is lowered the operator would expect the fringes of the rescue litter to come into view—however, they would not since they are not captured by the HMD camera. The fixed camera, however, is positioned such that the entire litter would be in view for all instances of operation, because the field of view between 607 and 608 capture the full length of the litter. Prior to the lowering rescue litter reaching the level of the cabin deck 620 the user could or will view the litter from his HMD camera 622. An ultrasound tracker provides high resolution head position data which is used to determine precisely the head-mounted camera position 622 relative to the fixed camera's position, shown at 614. The magenta-colored floor 624 acts as a backdrop to the litter. Once the litter 618 has reached a predetermined level above the floor or deck 620 the cable (not shown) will physically cease paying out, but the electrical commands of the hoist control will command the depth of the virtual litter, composed of real time video from the fixed camera. The fixed camera video pixels associated with the litter and rescue personnel are isolated via Chromakey and pasted onto a transparent virtual billboard, and this billboard moves in the virtual environment in response to the hoist controller's commands and the helicopter's virtual motion. The video from the hoist operator's helmet-mounted camera is processed such that the pixels associated with the litter and rescue personnel are replaced by the fixed camera video. All other video from the helmet-mounted display is preserved and viewed by the operator.

Figure 11:
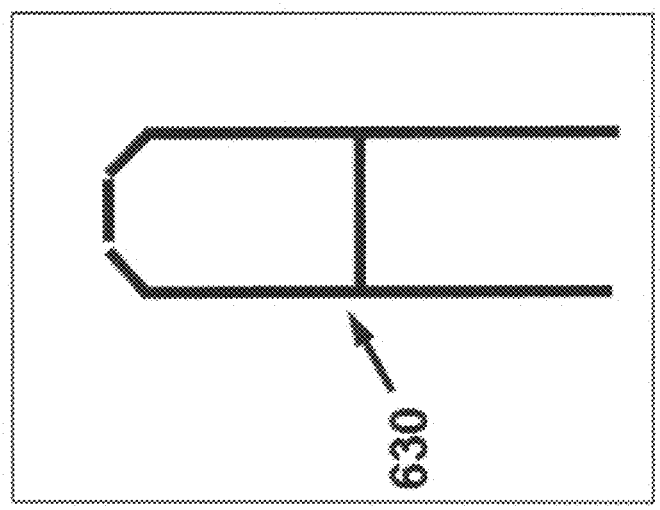
FIG. 11 is a schematic illustration of a stripped video image frame corresponding to the FIG. 10 schematic illustration.
Figure 10:
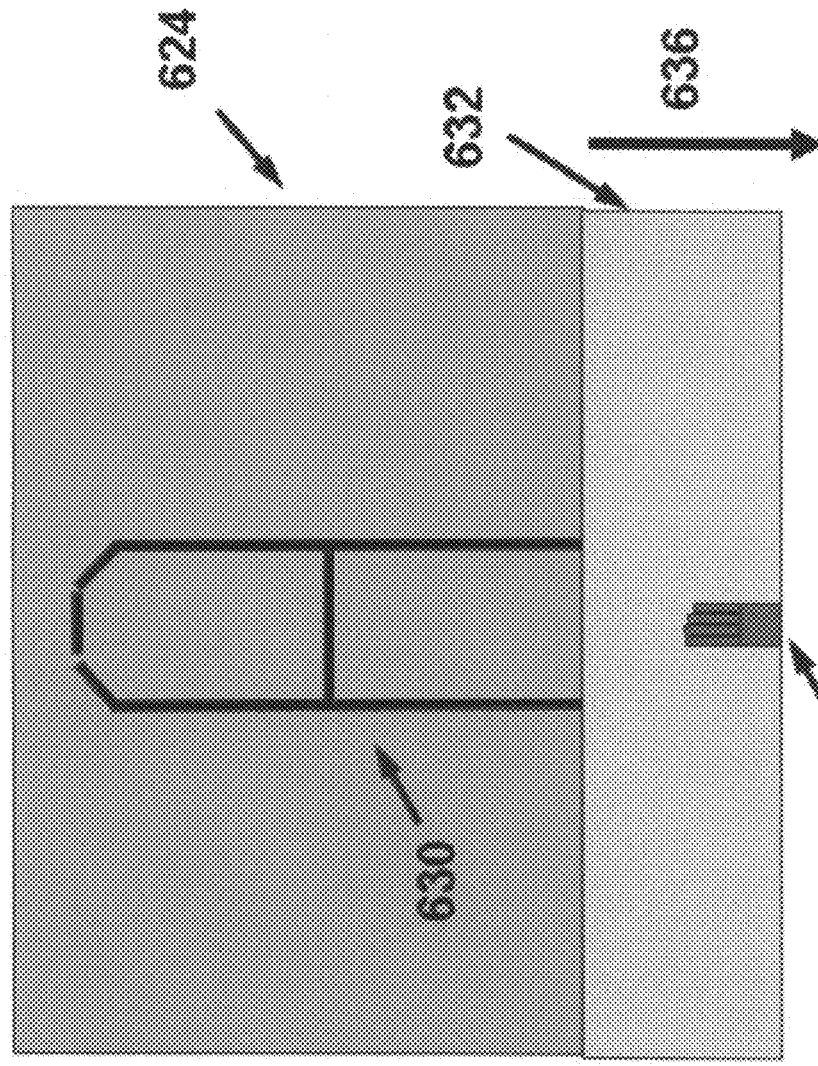
FIG. 10 is an schematic illustration of a raw video image frame as viewed from a camera component of the FIG. 8 embodiment.
Figure 13:
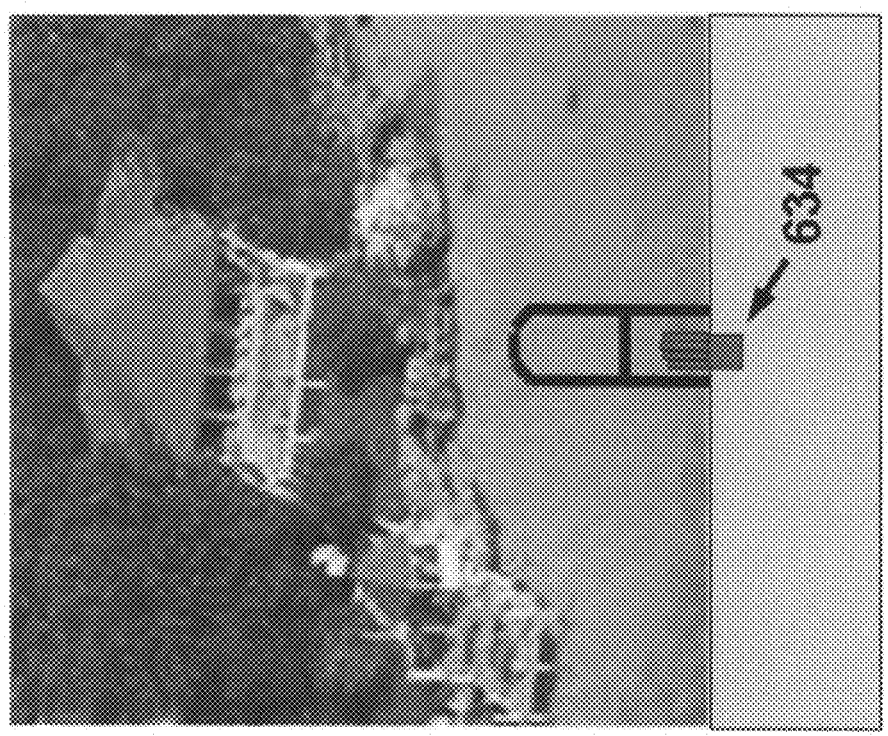
FIG. 13 is an combined image of the FIG. 8 embodiment using the FIG. 10 illustration.
Figure 12:
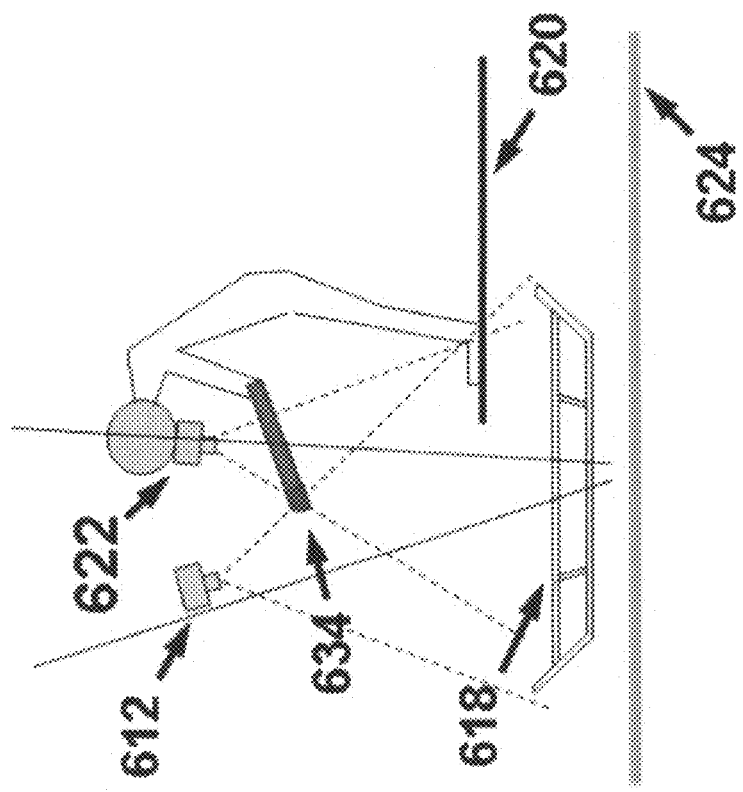
FIG. 12 is a schematic illustration of translation of a video image from the view from the camera component to the view from the user's head mounted device of the FIG. 8 embodiment.

The video associated with the area above the deck area is removed, as shown in FIGS. 10-13, as are the video pixels belonging to the magenta keying color. FIG. 10 is a schematic illustration showing a representation of a rescue litter 630, a cabin deck 632 and a flight glove 634 from a fixed camera view, i.e., a raw video view. All of the area below the cabin deck is discarded, as shown at 636. The remaining video pixels are those of the litter 630 and any pixels that are contained within or are overhanging the litter. The isolated litter video, shown in FIG. 11, is then pasted onto a virtual billboard. The user's tracked head position and attitude relative to the fixed camera is used to translate and rotate the user's perspective so that the observed position and orientation of the virtual billboard is consistent with the user's motion. If the user's hands or arms are in view of the HMD camera, as shown at 634 in FIGS. 9 and 12, the green pixels associated with the flight suit/gloves will be preserved but will not be pasted to the virtual billboard. In this way the user views the hands and arms that are over the deck edge in a conformal manner, shown for example in FIG. 12 at 634, with a background image also shown in FIG. 13. FIG. 14 illustrates the layer hierarchy described above, with the viewer's eye shown at 642, the green pixels and pixels aft of the cabin deck shown at 644, the litter placed on the virtual billboard 646 and the image generated scene shown at 648. When the hoist commands raises the virtual billboard to the level where the actual litter exists, that is, when the virtual cable length matches the actual cable length, the video will be removed from the virtual billboard, and the user will then view the litter from his/her own HMD camera 622.

Figure 15:
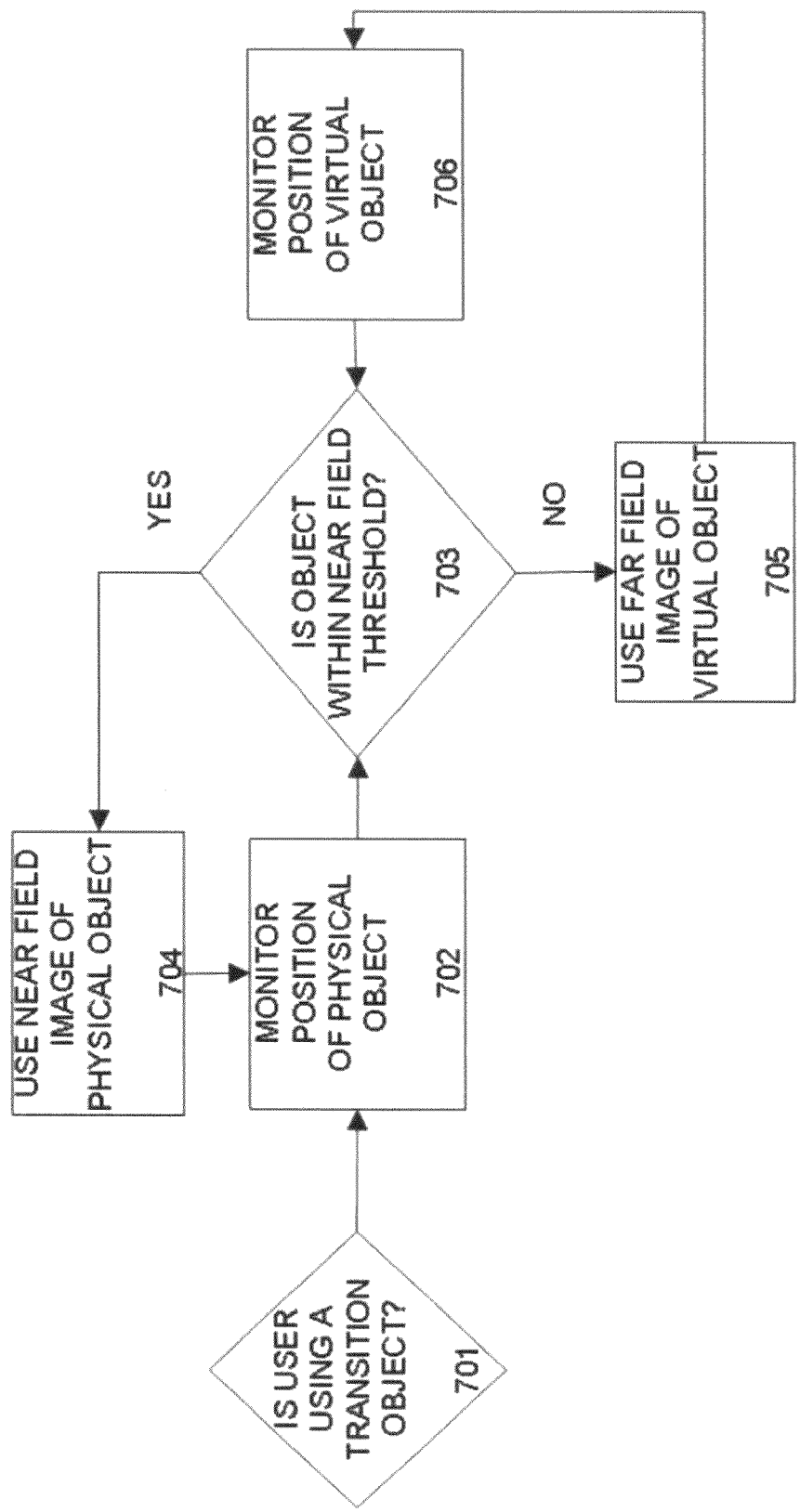
FIG. 15 is a flow diagram illustrating near-field/far-field transition operation of an alternate embodiment.

FIG. 15 illustrates the operation of an embodiment of the system in near-field to far-field transition and/or vice versa. At step 701 the system determines if a user is using a "transition object", i.e., an object that will be moved from a near-field position to a far-field position, and/or vice versa. If so, the position of the transition object is monitored at step 702. At step 703 it is determined if the object is within the near-field threshold. If so, the system uses the physical object image (sensed from the head-mounted camera) at step 704 and continues monitoring at step 702. If the transition object moves beyond the near-field transition at step 703, the "no" branch, then the object is replaced with the far-field virtual image at step 705. The perspective and position of the object the far-field virtual image depends on the orientation and position of the user manipulating the transition object as well as any controls, e.g., winch operation control that are being manipulated by the user. At step 706 the system monitors the position of the far-field transition object. At step 703 it is determined whether the object comes close enough to the user to become a near-field object. If not, the "no" branch, the object remains a far-field object and monitoring continues at step 705. If the object returns to the near-field, the system once again uses the near-field image at step 704.

Figure 16A:
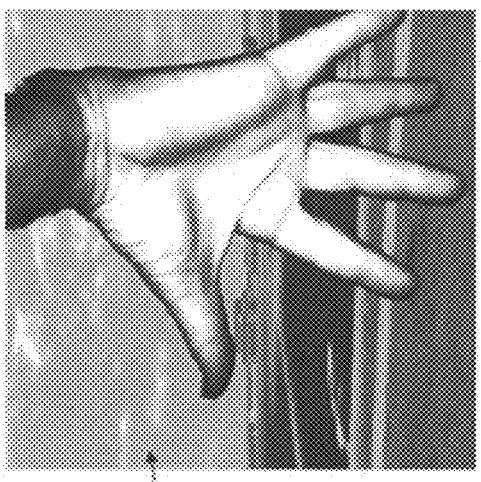
FIGS. 16A-16C illustrate virtual deployment of real-time video.
Figure 16B:
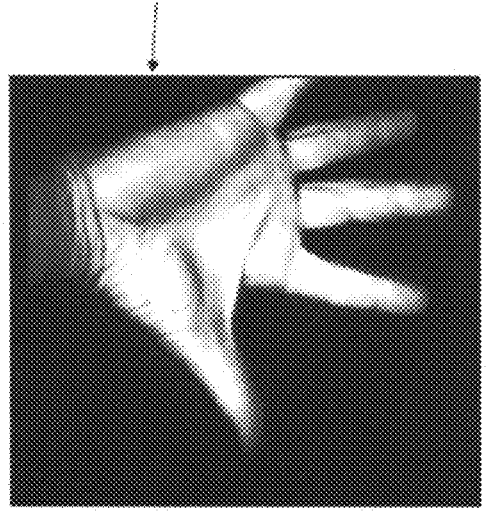
Figure 16C:
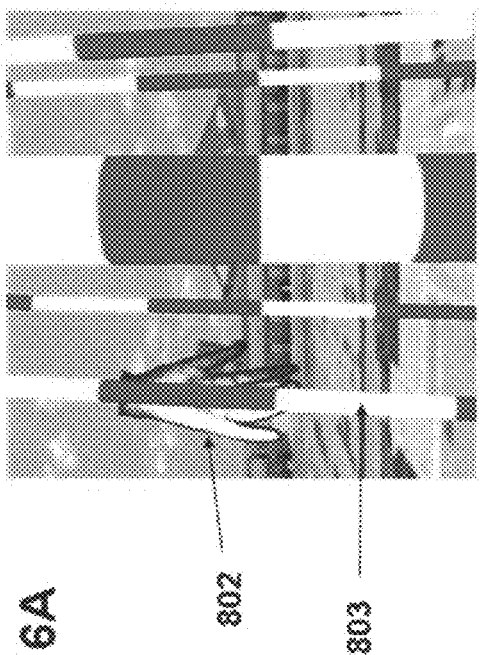

FIGS. 16A-16C demonstrate a physical object's image being deployed into a virtual environment. FIG. 16A shows a hand 800 with a black backdrop. All the pixels in FIG. 16A that have brightness values below a threshold are rendered transparent, becoming windows to the virtual simulated environment layer below the video layer, shown as 801 in FIG. 16B. FIG. 16B shows the composite image. The preserved video pixels are pasted onto a virtual billboard which is commanded to move through the virtual environment with a joystick. FIG. 16C shows the hand 802 being maneuvered behind one of the struts 803 of a virtual water tower.

Hue, Saturation and Brightness Color Coordinate System

Figure 17:
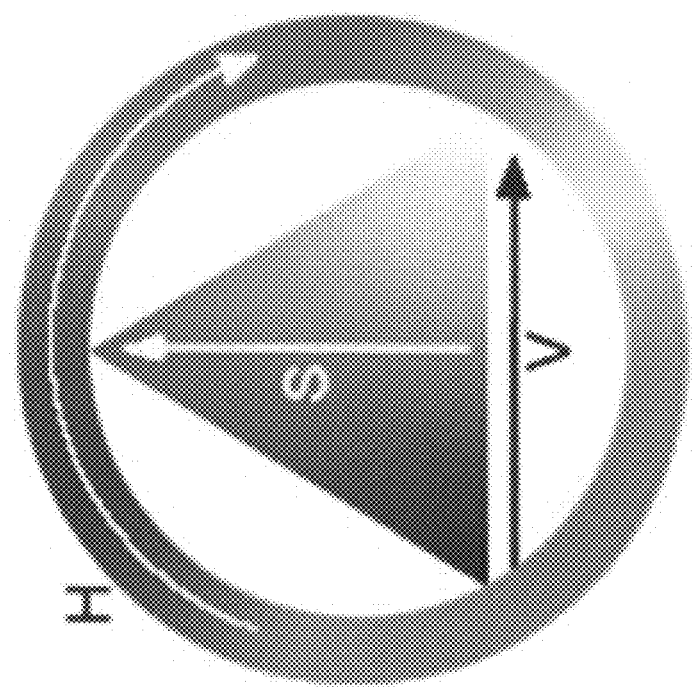
FIG. 17 is a diagram illustrating the HSV color space as a color wheel.
Figure 19:
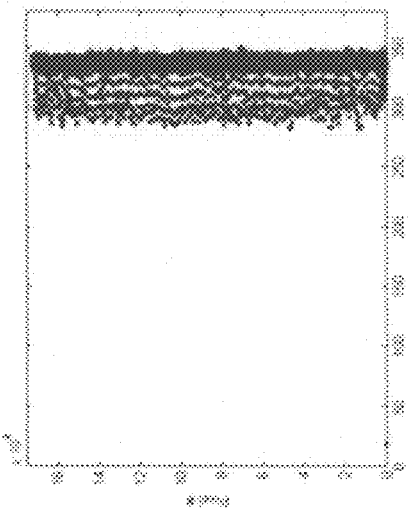
FIGS. 19-24 are distribution plots and thresholds for a preferred embodiment.
Figure 20:
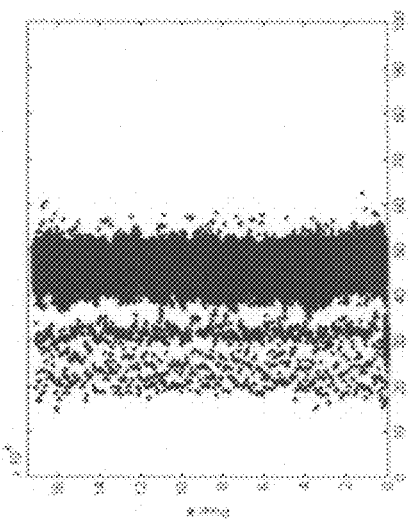
Figure 21:
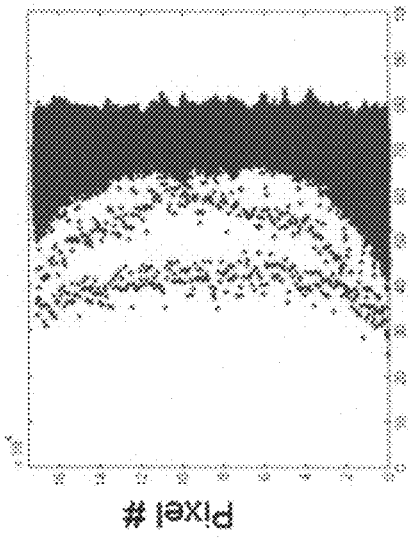

The present system and methods may also use the Hue, Saturation and Brightness (HSV) color coordinate system for target recognition purposes. The HSV model, also called HSB, defines a color space in terms of three constituent components as will be described with reference to FIG. 17.

For the purposes of the present systems and methods Hue or "H" specifies the dominant wavelength of the color, except in the range between red and indigo, that is, somewhere between 240 and 360 degrees, where Hue denotes a position along the line of pure purples. The value is roughly analogous to the total power of the spectrum, or the maximum amplitude of the light waveform. However, as may be seen from the equations below that value is actually closer to the power of the greatest spectral component (the statistical mode, not the cumulative power across the distribution).

Similarly, in the present systems and methods Saturation or "S" refers to the "vibrancy" of the color, and its values range from 0-100%, or 0.0 to 1.0. It is also sometimes called the "purity" by analogy to the colorimetric quantities excitation purity and colorimeric purity. The lower the saturation of a color, the more "grayness" is present and the more faded the color will appear. The saturation of a color is determined by a combination of light intensity and how much it is distributed across the spectrum of different wavelengths. The purest color is achieved by using just one wavelength at a high intensity, such as in laser light. If the intensity drops, so does the saturation.

In the present system the term Value or "V" refers to the brightness of the color, and this value ranges from 0-100% with 0% representing the minimum value of the chosen color and 100% representing the maximum value of the chosen color.

Given a color in the RGB system defined by (R, G, B) where R, G, and B are between 0.0 and 1.0, with 0.0 being the least amount and 1.0 being the greatest amount of that color, an equivalent (H, S, V) color can be determined by a series of formulas. Let MAX equal the maximum of the (R, G, B) values and MIN equal the minimum of those values. The formula can then be written as $$H = \begin{cases} 60 \times \frac{G-B}{MAX-MIN} + 0, & \text{if } MAX = R \\ 60 \times \frac{B-R}{MAX-MIN} + 120, & \text{if } MAX = G \\ 60 \times \frac{R-G}{MAX-MIN} + 240, & \text{if } MAX = B \end{cases}$$

$$S = \frac{MAX - MIN}{MAX}$$

$$V = MAX.$$

The resulting values are in (H, S, V) form, where H varies from 0.0 to 360.0, indicating the angle in degrees around the color circle where the hue is located. The S and V values vary from 0.0 to 1.0, with 0.0 being the least amount and 1.0 being the greatest amount of saturation or value, respectively. As an angular coordinate, H can wrap around from 360 back to 0, so any value of H outside of the 0.0 to 360.0 range can be mapped onto that range by dividing H by 360.0, taking the absolute value and finding the remainder. This type of calculation is also known as modular arithmetic. Thus, −30 is equivalent to 330, and 480 is equivalent to 120, for example.

For a given target hue and saturation range, a range of brightness values can be specified that would correspond to the range of lighting conditions that could be expected in the operating environment.

Pixel Masking in the HSV System

Figure 18:
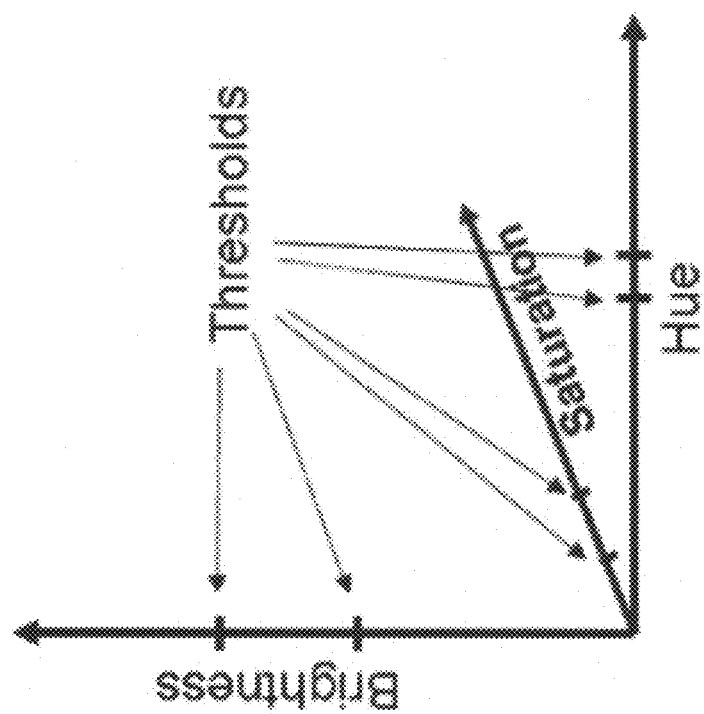
FIG. 18 is a graph illustrating HSV threshold values.

Another solution to target color recognition results from training the system in a variety of lighting conditions so that accurate pixel masking may result. In attempts to produce this, light intensity reaching a colored panel is varied by changing the distance between a light bulb and the panel. The camera is trained on the colored panel while in the auto-exposure mode and for each new distance the HSV components registered by the camera are recorded. This in effect generates an HSV map for varying light intensities. FIG. 18 shows an example of HSV thresholds, and if a pixel's HSV values all fall within them the pixel is rendered transparent.

Figure 22:
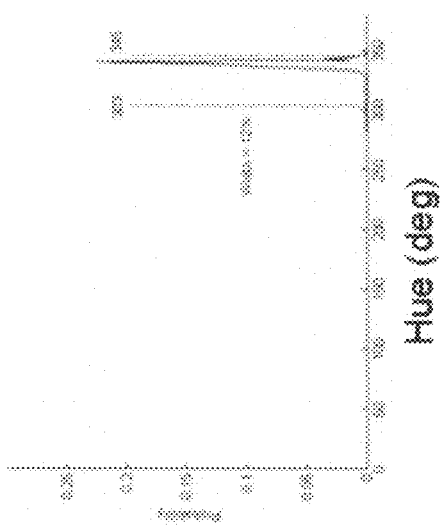
Figure 23:
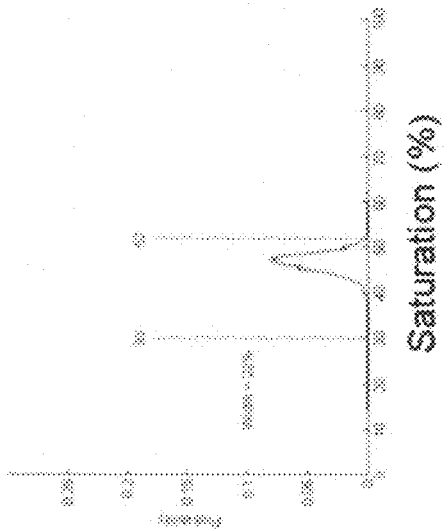
Figure 24:
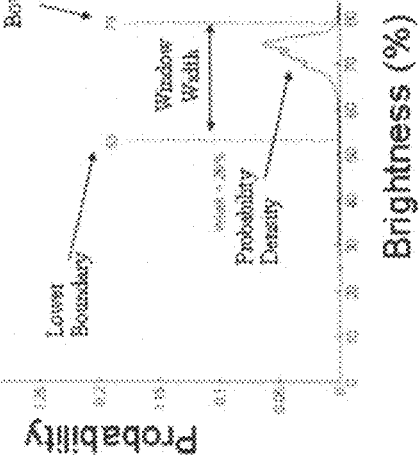

FIGS. 19-24 show the pixel scatter plots for Brightness (FIG. 19), Saturation (FIG. 20) and Hue (FIG. 21) corresponding to an image of magenta fabric. FIGS. 22-24 plot the probability densities of these scatter plots, and the lower and upper boundaries containing 99% of all the pixels. Thus, it is possible to statistically define the HSV characteristics of a relatively uniformly colored image simply through lower and upper boundaries—a much simpler process than the RGB mapping, which requires linear interpolation. Note that magenta is predominantly red, which would correspond to a hue that is near 360 degrees, the hue seen in FIGS. 19-24 is concentrated in a band at approximately 340 degrees.

Depth Ranging

Figure 25:
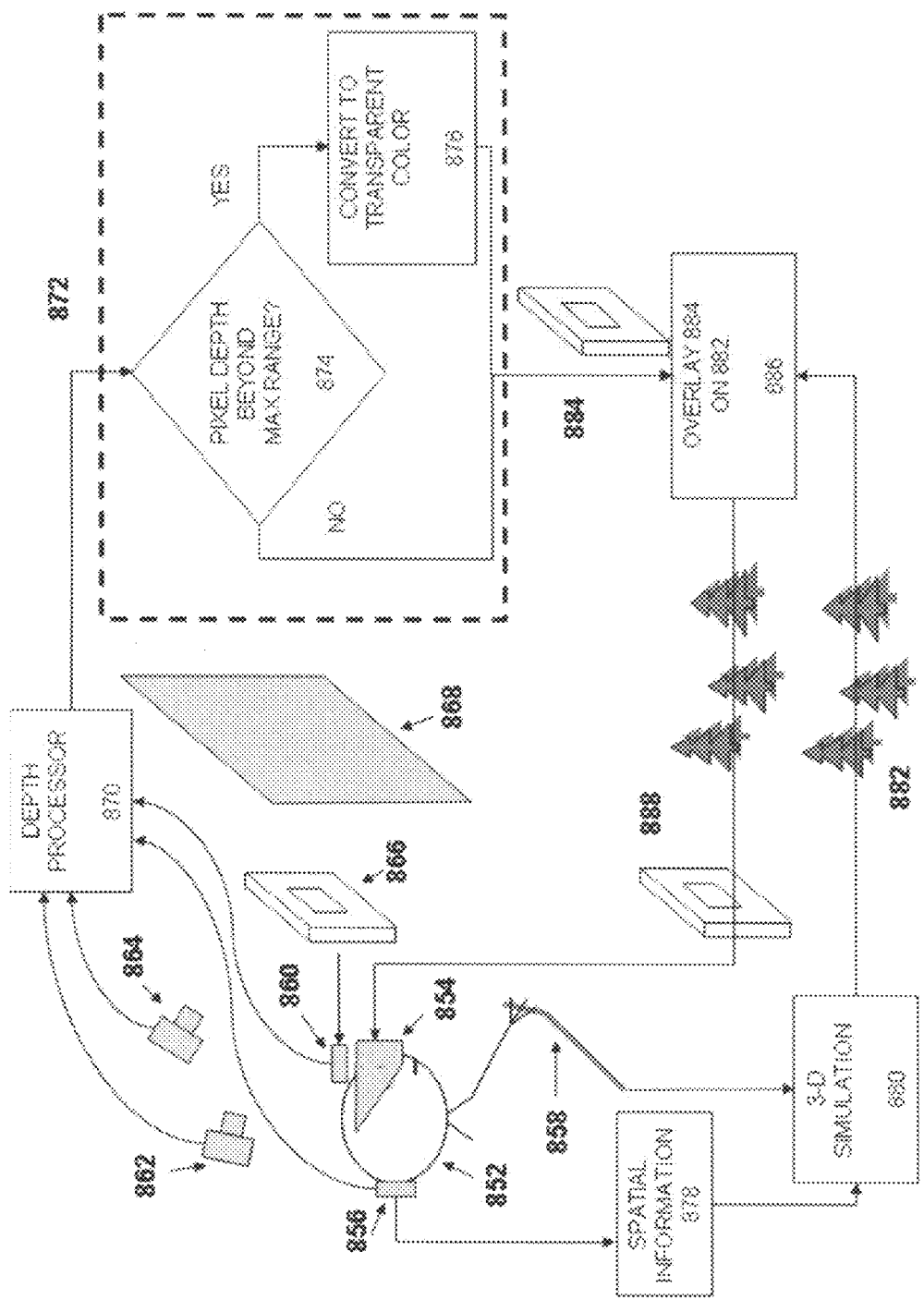
FIG. 25 is a schematic diagram of an alternate embodiment that includes a virtual portal designation using depth ranging; and, FIG. 26 is a schematic diagram of the camera and depth sensor configuration of the FIG. 25 embodiment.
Figure 26:
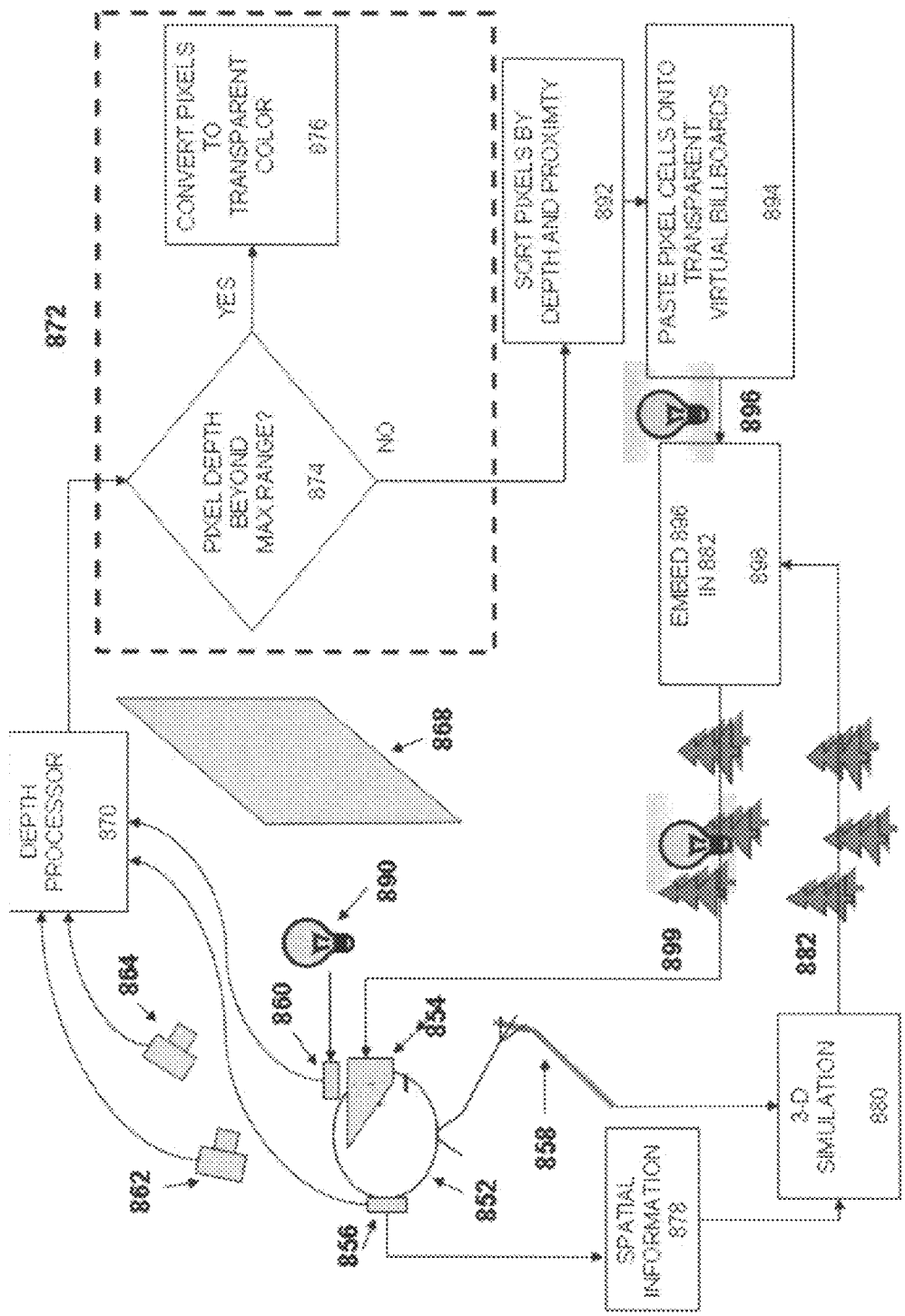
Figure 27:
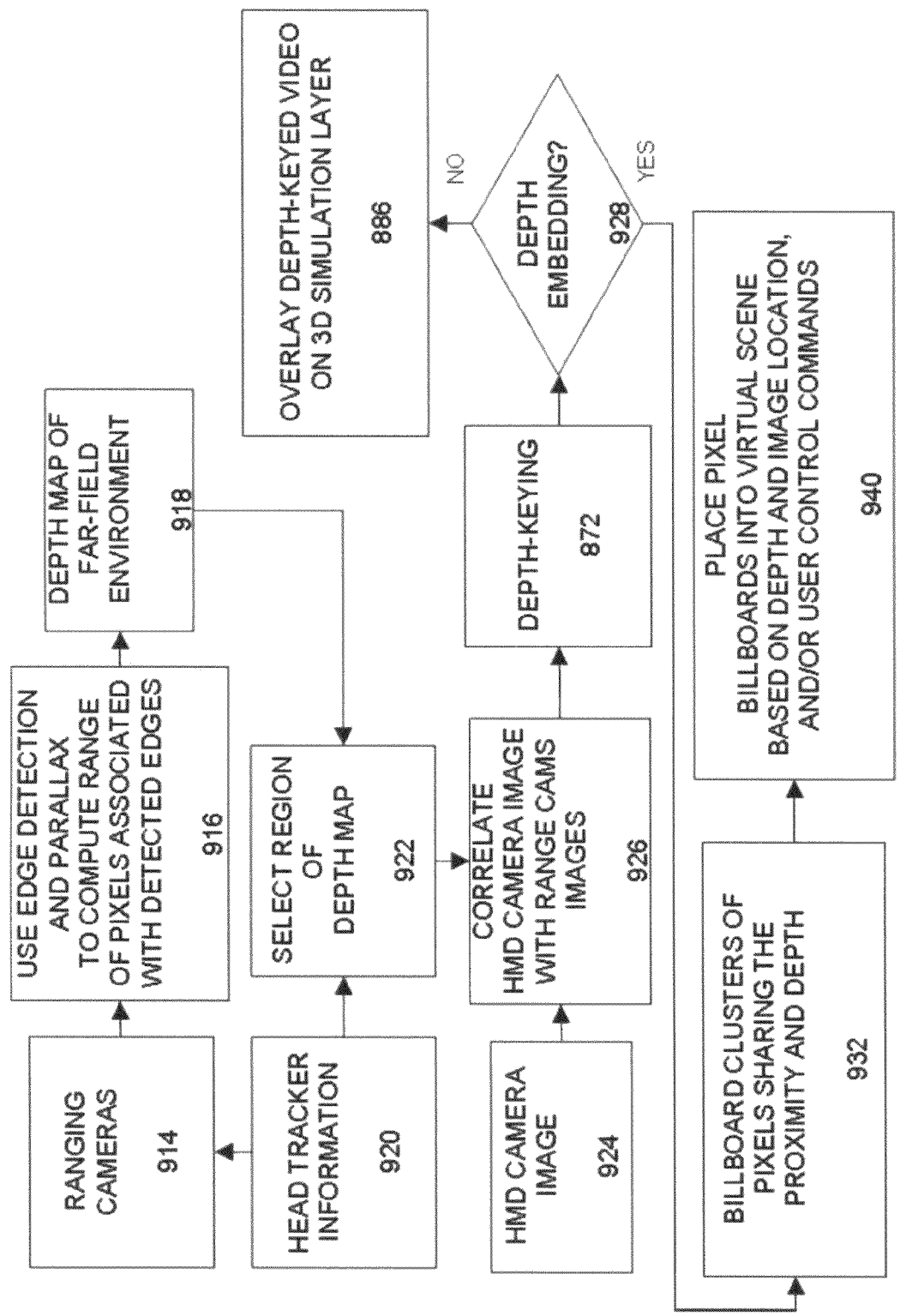
FIG. 27 is a flow chart of the processes depicted in FIGS. 25-26.
Figure 28:
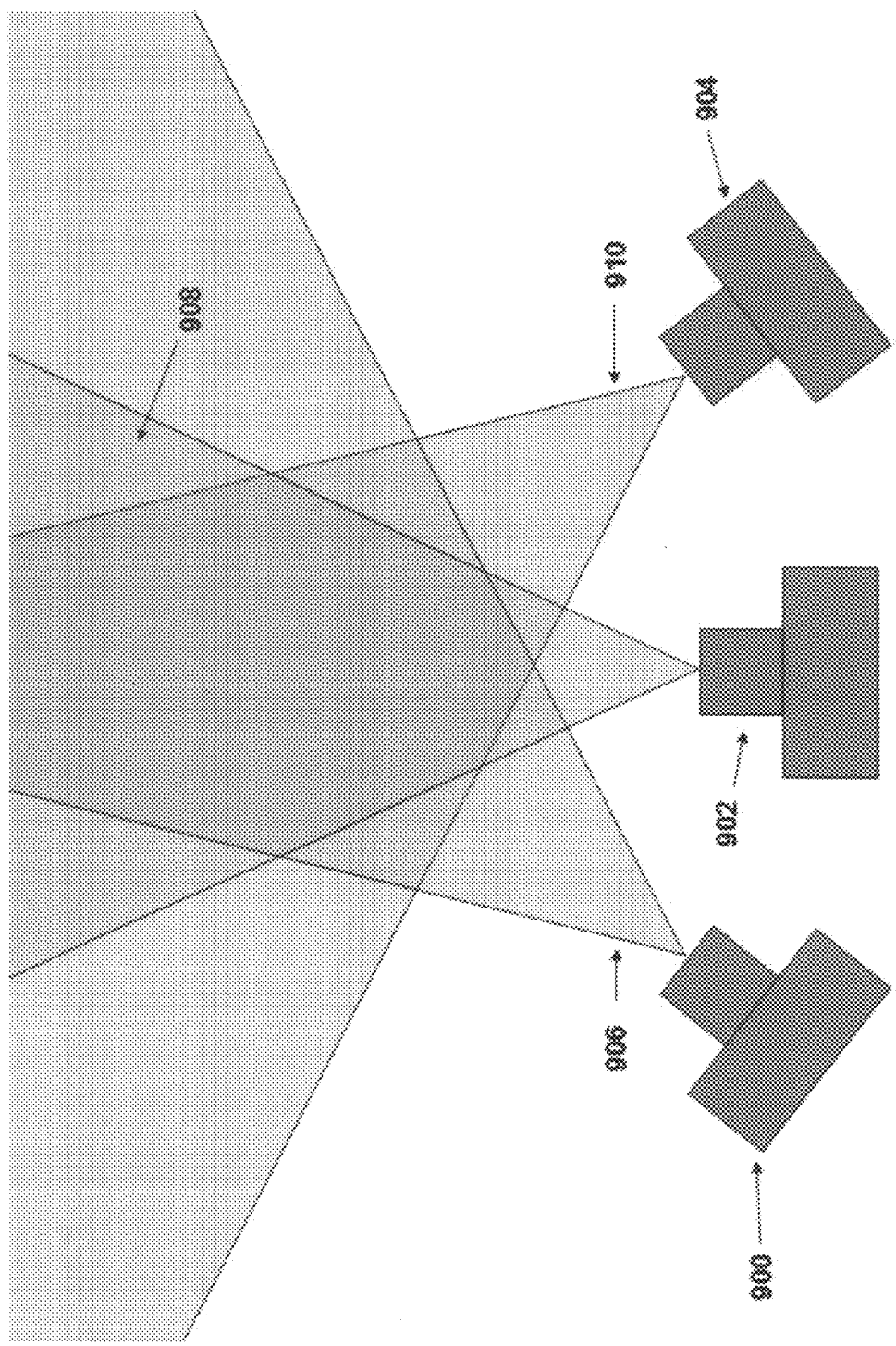
FIG. 28 is a schematic diagram of a preferred camera configuration for explicit far-field depth sensing and monocular display of a depth-keyed image.

With reference to FIGS. 25-28, an alternative method to using color for virtual portal designation is using the depth of sensed object pixels is described. In this context the term depth refers to the distance between the position of a predetermined object and the position of a predetermined sensor, preferably a camera mounted on or near the head of the user. In this context the term "pixel depth" refers to those pixels associated with the distance of a sensed object from a predetermined sensor, preferably a camera. The parallax in the stereoscopic image can give range information on each pixel, as can laser ranging. Pixels within a given range threshold can be preserved—those outside of the threshold can be made transparent. This approach would eliminate the requirement of a background color, such as magenta, and relatively few to no modifications would have to be made to a cabin or cockpit to accommodate system requirements to create a combined environment. FIG. 25 shows a representation of such an alternate system and process. User 852 has an HMD 854 and a head tracker 856. The user is also shown holding aircraft controls 858. HMD camera 860 and cameras 862 and 864 are used for sensing depth. Cameras 862 and 864 are mounted on the HMD, flanking, left and right camera 860 as shown in FIG. 28, and/or mounted in the environment external to the HMD. When mounted in the environment, cameras 862 and 864 can be commanded to swivel and translate in response to the user's head movements. Additional cameras can be placed in the environment. The purpose of the cameras is to create a depth map of the user's environment.

In FIG. 25 cameras 860, 862 and 864, and tracker 856 provide information to the conventional depth processor circuit 870, which correlates the image pixels of HMD camera 860 to depth. In this example the image sensed by HMD camera 860 is composed of a near-field window sill 866 and a far-field backdrop 868. Depth information on the image is sent to the video capture circuit or board 872, where a check, shown at 874, is performed on each pixel to determine if its depth lies beyond a predetermined distance. If so, the pixel is rendered transparent in 876. Signals from control devices 858 that the user manipulates to interact with the virtual environment, as well as head spatial information, represented at 878 are sent to the 3-D simulation circuit 880, which produces a graphical representation of the simulation, shown at 882. The processed video layer 884 is overlaid on the simulation layer 882 in the overlay circuit 886, either through digital combination or a conventional 3D graphics application programming interface, and the composite image 888 is sent to the user's HMD 854 for display.

An alternative application of depth-keying is given in FIG. 26. As in FIG. 25 the image observed by the HMD camera is composed of a near-field object 890 and a far-field object 868. The near-field object pixels are preserved based on sensed range, and the far-field object pixels are rendered transparent. The near-field pixels are sorted by depth and proximity in circuit 892 and pasted onto transparent virtual billboards in 894. This output 896 is sent to the 3D graphics API and embedded into the 3D simulation environment 882, shown in 898. The output 899 is sent to the HMD for display to the user.

In FIG. 26 the pixel depths computed from the depth processor 870 and the planar locations of the pixels on the image are used to position the video pixels and their billboard 894 appropriately within the virtual scene. In this way one or more objects associated with the physical near-field scene can be virtually situated, via one or more billboards, in front of and behind virtual objects, occluding and being occluded by the virtual objects, shown at 896. User controls can also be employed to move both the virtual objects and virtual billboards within the scene.

FIG. 27 is a flow chart of the processes shown in FIG. 25-26. Ranging cameras in 914 receive spatial information 920 from the user's head tracker to either swivel appropriate cameras or sample video from appropriate cameras placed in the environment so that the HMD camera and range camera images overlap enough to extract stereo information. In 916 edge detection and image parallax are used to compute the range of pixels associated with detected edges. This produces a depth map of the far-field environment, 918. Head tracker information 920 is used to select the appropriate region of the depth map in 922, and this region is correlated with the HMD camera image, shown at (924 in 926 to allow depth keying at process 872, which is shown in FIGS. 25-26 at 886 and 896, respectively. If the HMD pixels correlated to depth are to be embedded in the 3D simulation at the yes branch shown at 928), then at block 932, pixels are clustered according to depth and proximity and put onto billboards. Next, at 940 the pixel billboards are placed into the virtual scene based on depth, image location, and any control commands the user may issue. If depth embedding is not employed, at the no branch in block 928, the pixels depth-keyed video layer is overlaid on the 3D simulation layer at block 886 seen in FIG. 25.

Figure 29:
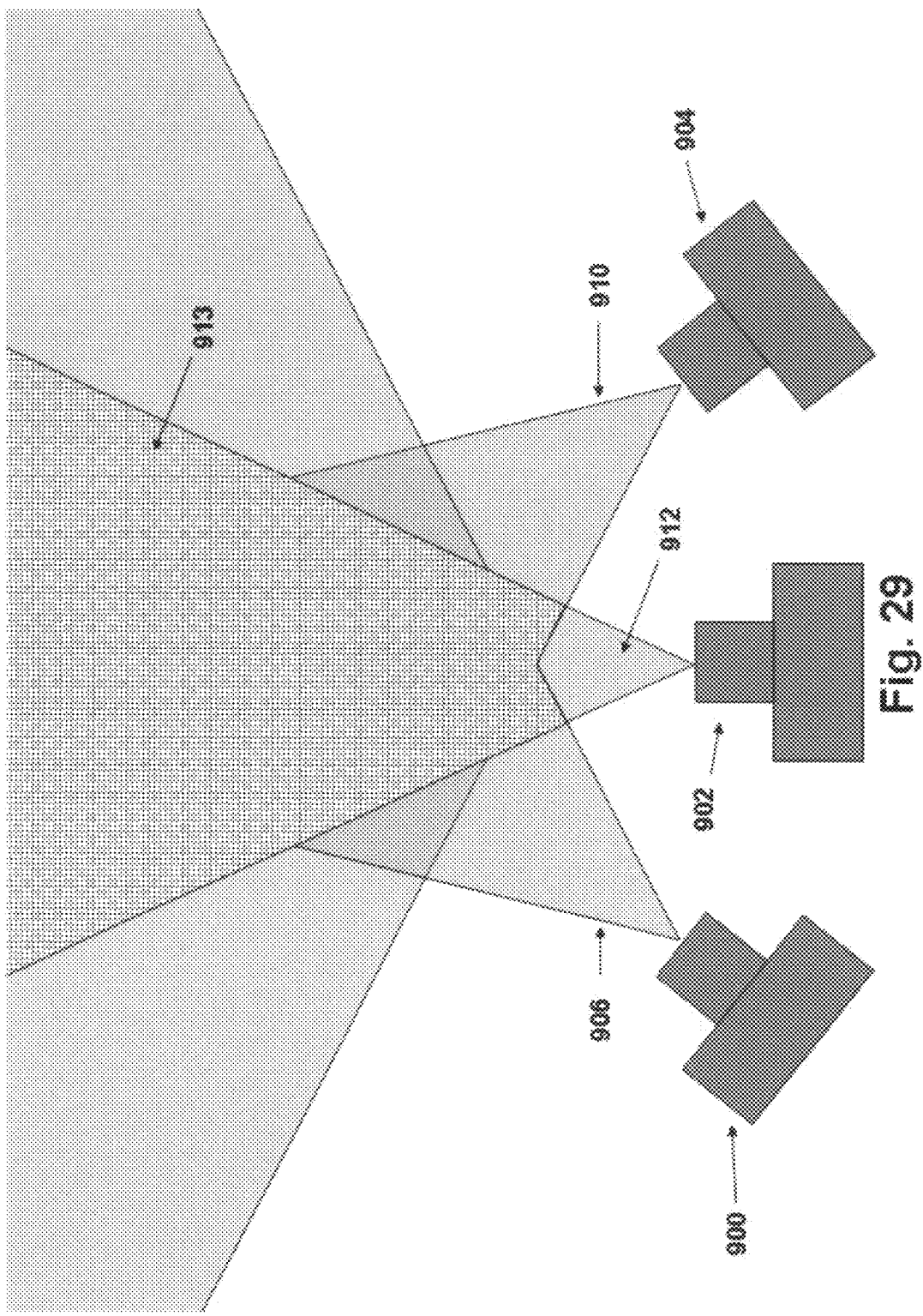
FIG. 29 shows regions where stereoscopy exists within the displaying camera's field of view for the camera configuration given in FIG. 28.

FIG. 28 shows a possible configuration of cameras mounted on the HMD that can be used for stereoscopic depth sensing, where a central camera 902 is flanked on the left by camera 900 and on the right by camera 904. The fields of view (FOV) for cameras 900-904 are denoted by 906-910, respectively. If the exact distance of objects directly in front of the user, i.e., within arm's reach is not required, the flanking cameras 900 and 904 can be oriented so that their overlapping FOV's include the farthest distance of interest. This can leave an area of the central camera's FOV, shown at 912 in FIG. 29 that is not included in the flanking cameras' FOV's. Pixels of objects that appear in the central camera's FOV but not in either of the flanking cameras' FOV, i.e., the area at 912 are then designated as "near-field" and keyed appropriately from central camera 902 images. The configuration shown in FIG. 29 would be employed when the distance of far-field objects is of primary interest, where stereoscopic cueing would be of minimal use to the user for depth perception. Because of this, the single camera 902 view of the scene is given to the user, appropriately keyed via the flanking cameras' sensing.

Figure 30:
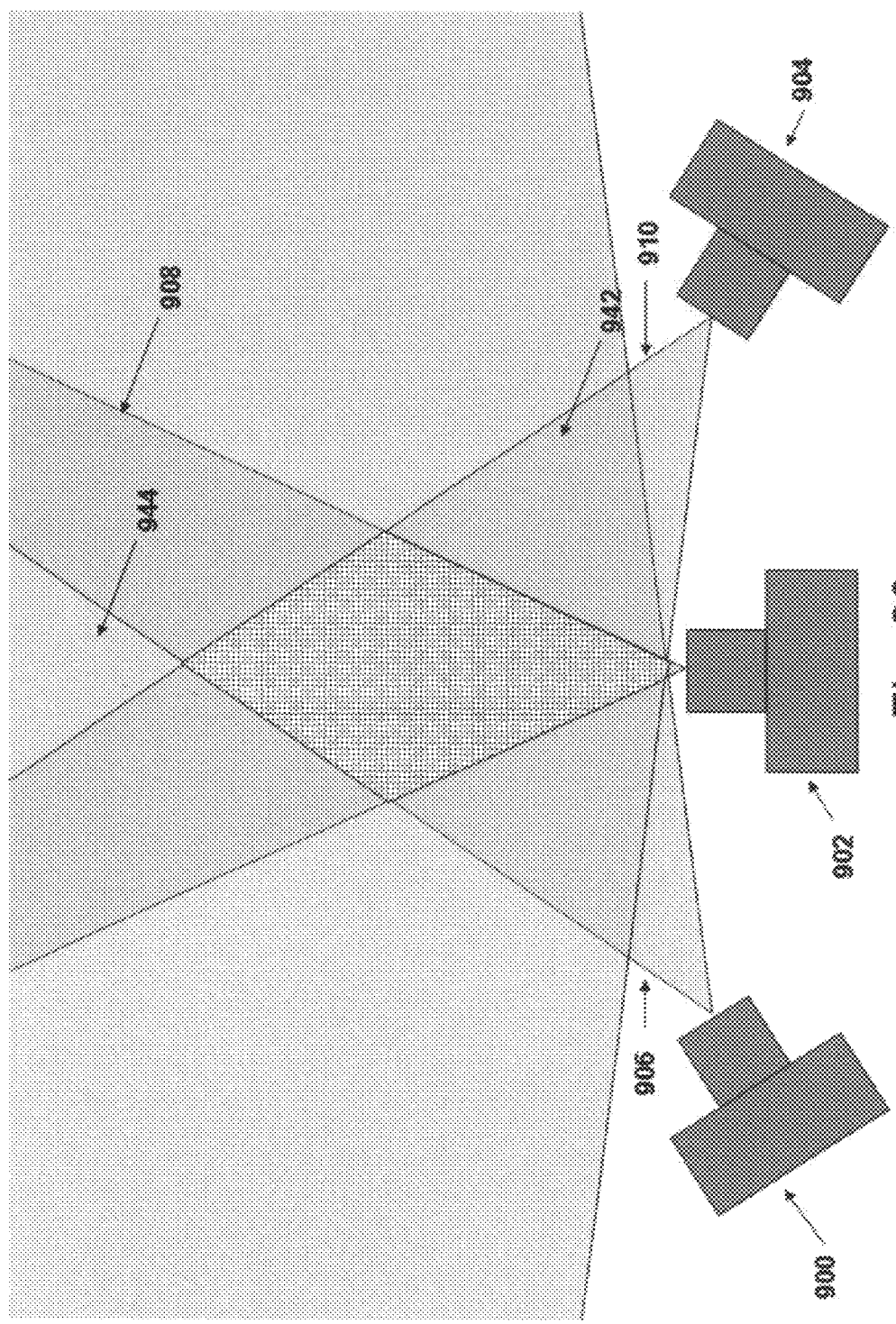
FIG. 30 is a schematic diagram of a preferred camera configuration for explicit near-field depth sensing, regions where stereoscopy exists within the displaying camera's field of view, and monocular display of a depth-keyed image.
Figure 31:
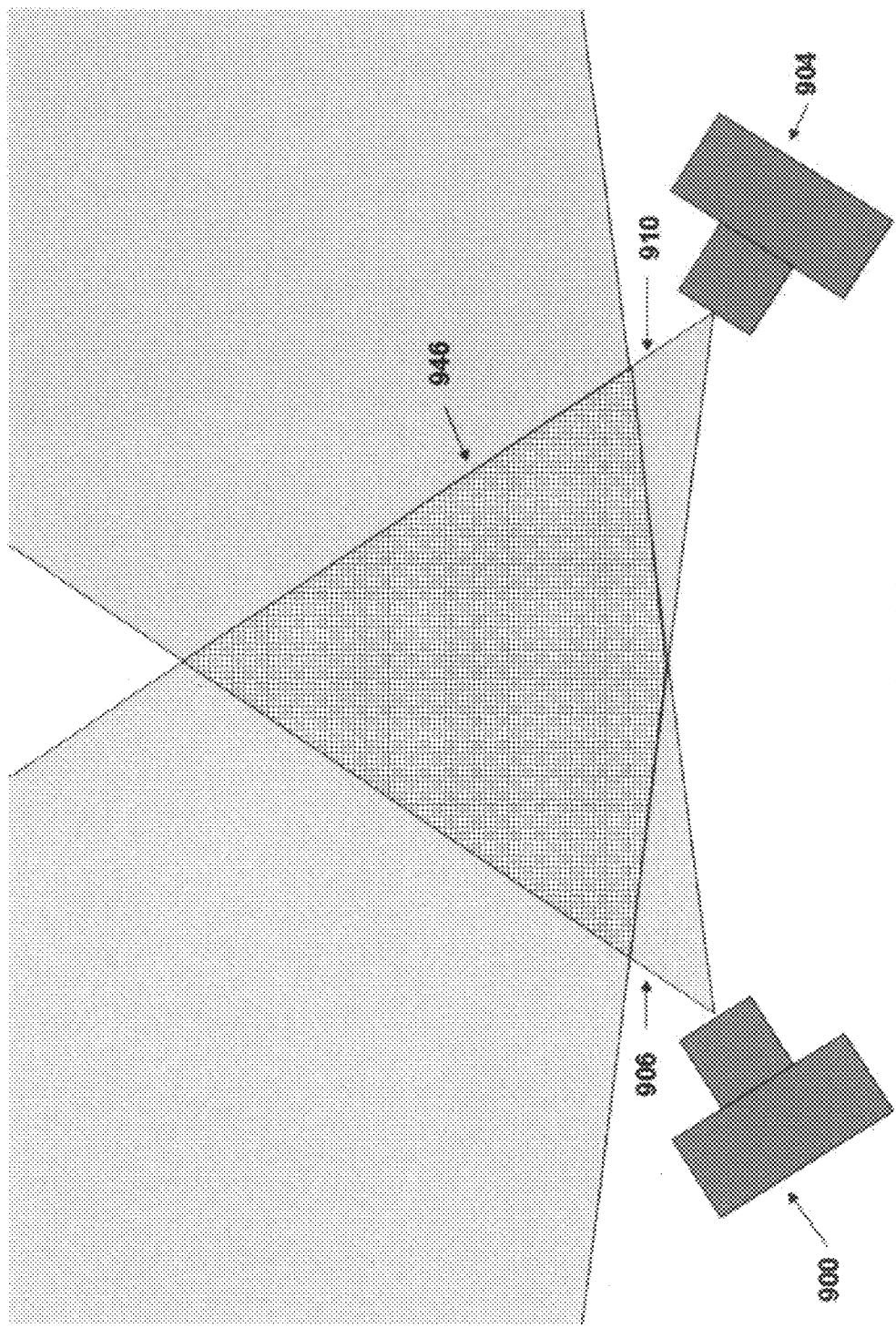
FIG. 31 is a schematic diagram of a preferred camera configuration for explicit near-field depth sensing, regions where stereoscopy exists within the displaying cameras' fields of view, and stereoscopic display of the depth-keyed image.

Conversely, where near-field objects are of primary interest, FIG. 30 shows the flanking cameras 900 and 904 oriented such that their FOV's 906 and 910 include objects that are nearly directly in front of the central camera. Objects that lie in region 942 will be depth-keyed in the image of camera 902, and objects that lie within region 944, i.e., those that are not included in all the FOV's 906, 908 and 910, are designated as far-field and can be keyed out. The camera configuration shown in FIG. 30 would be used when stereoscopic cueing would not be very useful to the viewer, i.e., the user will not be conducting tasks that require near-field depth judgment such as manual tasks, and a monocular view from camera 902 would suffice. When stereoscopy would be important for near-field operations and far-field objects do not appear, such as in an enclosed room, only two cameras as shown in FIG. 31 would be needed. Objects that lie in region 946 would be both depth-sensed, that is, available for depth-keying, and displayed stereoscopically via each camera 900 and 904 to the left and right eyes, respectively.

Figure 32:
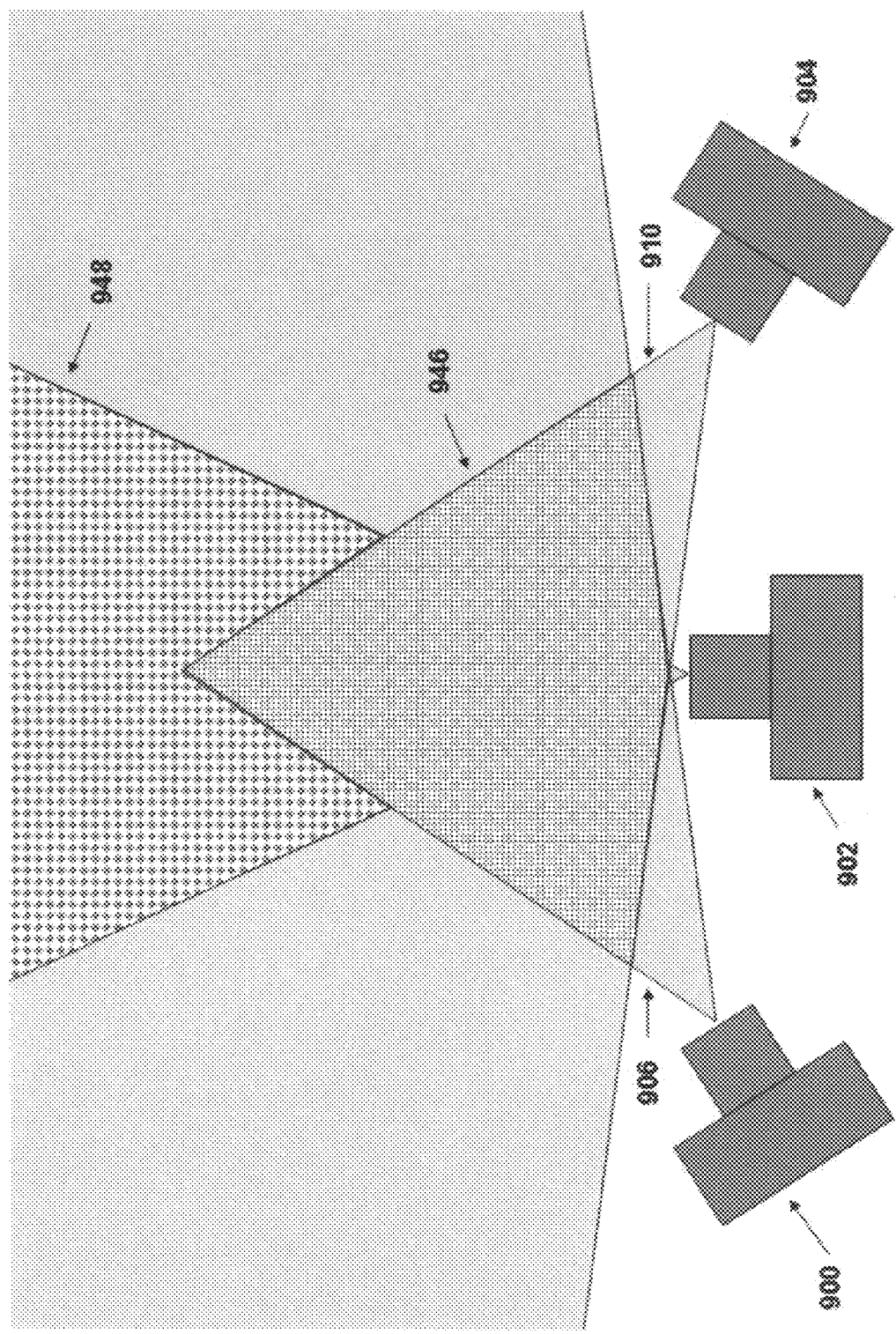
FIG. 32 is a schematic diagram of a preferred camera configuration for: 1) explicit near-field depth sensing; 2) regions where stereoscopy exists within the displaying cameras' fields of view; 3) stereoscopic and monocular display of a depth-keyed image.
Figure 33:
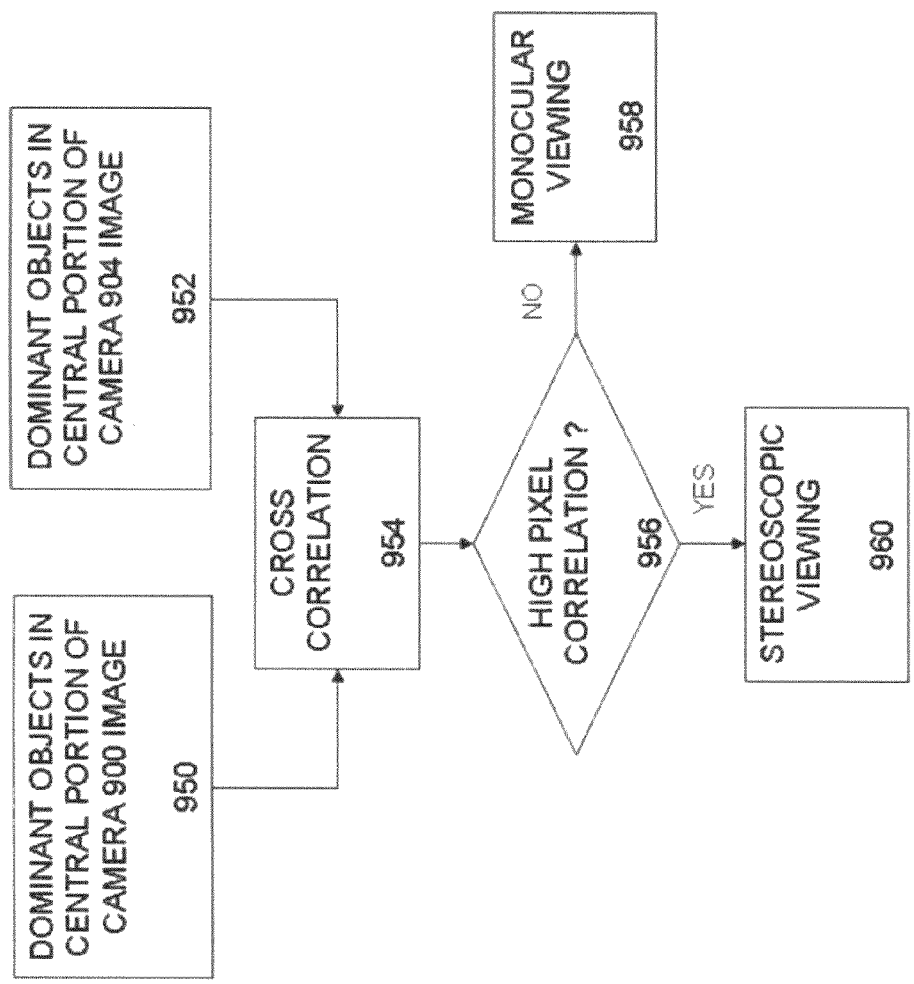
FIG. 33 is a flow chart of the logic governing selection of monocular and stereoscopic viewing for the camera configuration shown in FIG. 32.
Figure 34:
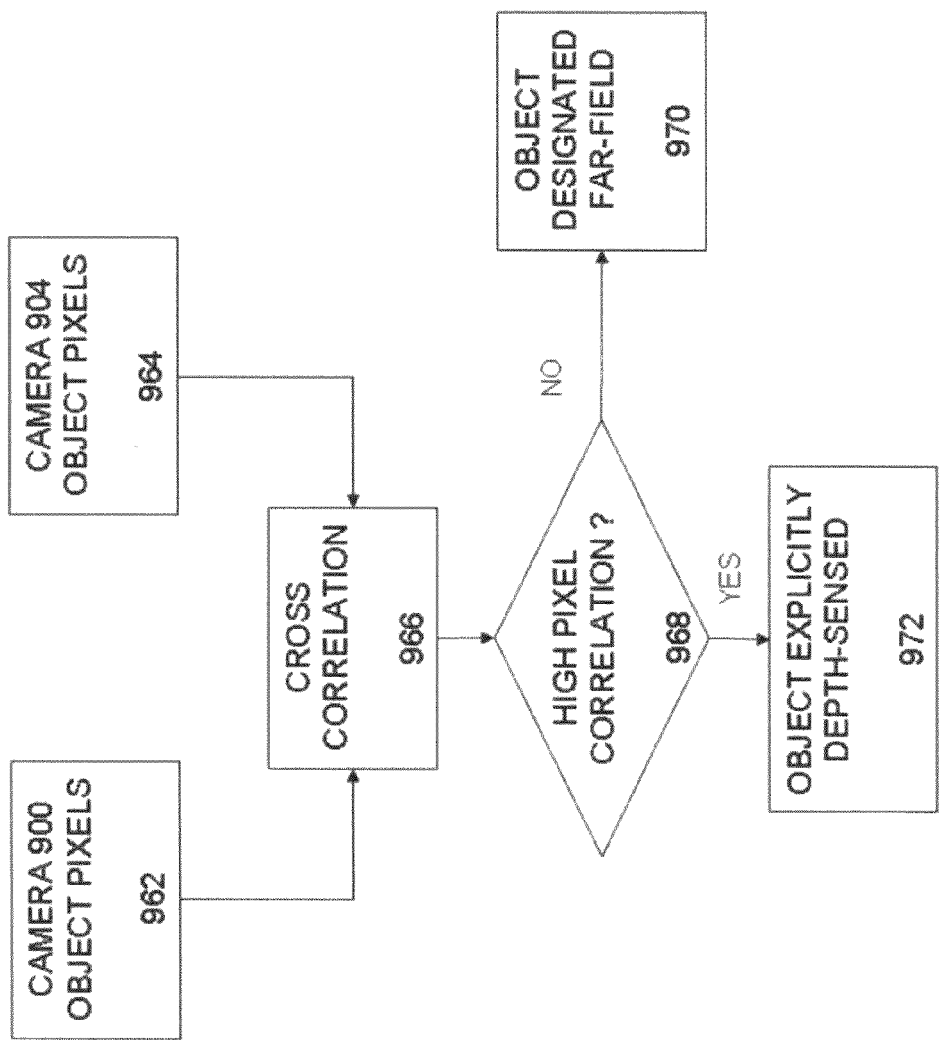
FIG. 34 is a flow chart for the camera configuration shown in FIG. 32 of the processes designating objects: 1) explicitly depth-sensed in the near-field; 2) implicitly depth-sensed in the far-field.

With reference to FIGS. 32-43, for operations that involve near-field tasks where stereoscopic cues are important, and require approximate far-field sensing, the camera configuration shown in FIG. 32 would be employed. In FIG. 33 objects that dominate the central portions of cameras 900 and 904 and are shared by both cameras, indicated by a high cross-correlation in block 956 in FIG. 33, will trigger stereoscopic viewing 960, otherwise monocular viewing via camera 902 will be triggered at 958. In FIG. 34 object pixels from camera 900 are cross-correlated with object pixels from camera 904. Any object pixels that appear in both flanking cameras 900 and 904 FOV's, shown as region 946 in FIG. 32, and indicated by a high cross-correlation in block 968 will be explicitly depth-sensed via stereo imaging at block 972, otherwise in 972 they will designated as far-field, that is, corresponding to region 948 in FIG. 32.

Although specific embodiments of the invention have been described, various modifications, alterations, alternative constructions, and equivalents are also encompassed within the scope of the invention. The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A virtual reality system comprising:
  a head mounted camera and one or more fixed cameras adapted to receive images of a physical environment and to produce a frame of the physical environment that contains pixels representing at least a first range of electromagnetic spectrum values;

at least one range of predetermined target threshold electromagnetic spectrum values;

a means for processing the frame and rendering pixels having values within the target threshold range of values to be transparent pixels;

a means for generating a virtual image;

a means for combining the virtual image with the frame of the physical environment to form a combined image whereby the virtual image is visible at all positions of the transparent pixels; and, a means for displaying the combined image.

2. The system of claim 1 wherein the target threshold electromagnetic spectrum range of values includes values representative of one or more of hue, saturation or brightness.

3. The system of claim 1 further including a means for comparing the pixels of the frame to the target color under different predetermined electromagnetic conditions to determine whether a match with the target electromagnetic spectrum exists at any of the predetermined electromagnetic values.

4. The system of claim 1 further including a means for tracking locations of a physical object moving within a predetermined distance from the camera to produce a tracked object image and for replacing the tracked object image with a virtual image of the tracked object when the physical object moves beyond the predetermined distance from the camera.

5. A method for combining virtual reality environments and real-time physical environments for a user comprising:

identifying a target pixel depth;

providing the real-time physical environment, the real-time physical environment having a predesignated area to be overlaid with virtual reality images and having the target pixel depth corresponding a predetermined distance to an object in the predesignated area;

identifying the predesignated area via pixel depth, whereby the depth is determined by distance from the object in the predesignated area to a first distance sensor;

determining the distance from the first distance sensor to the object with at least one distance sensor selected from the group consisting of camera, laser, lidar, sonar and stereoscopy devices;

providing virtual reality images;

providing the user with a head mounted display adapted to have a perspective during use corresponding to a perspective of the user's eyes along a predetermined line of sight;

providing a first depth sensor, the first depth sensor being a video camera and mounting the video camera at a location from which the video camera has a perspective substantially similar to the perspective of the user's eyes;

providing a second depth sensor and a third depth sensor;

mounting the second depth sensor and mounting the third depth sensor at various locations around the user;

adapting the video camera, the second depth sensor and the third depth sensor to provide data representative of the distance from the object to the video camera along the line of sight;

operating the video camera to provide real video images of the real-time physical environment;

capturing the real video images in digital pixels;

identifying areas of the real video images to be overlaid with virtual video images by comparing the pixel depth of the digital pixels to a predetermined target pixel depth;

making transparent all digital pixels of the real video images whose pixel depth exceeds the predetermined target pixel depth;

overlaying the real video images onto the virtual video images to form a combined image; and, providing to the head mounted display the combined image.

6. A computer-implemented system for combining a virtual reality environment and a physical environment for a user comprising:

a computer;

a camera operatively connected to the computer and adapted to provide to the computer real-time physical environment video images in digital pixels using a hue, saturation and brightness color coordinate system, and adapted to be mounted on the head of a user at a location from which the camera has a view substantially similar to the view of the user's eyes;

a physical object operatively connected to the computer and adapted to interact with the user and to provide input to the computer in response to interaction with the user;

a virtual image generator operatively connected to the computer and adapted to provide to the computer virtual video images in digital pixels;

a position detector operatively connected to the computer and adapted to be mounted on the head of the user and to provide to the computer three-dimensional, spatial information about the location and direction of the user's head;

an image display operatively connected to the computer and adapted to be mounted on the head of the user and adapted to receive video images from the computer;

a real-time physical environment;

a pre-determined target masking color covering a predesignated area of the real-time physical environment;

the computer programmed to recognize the target masking color in the hue, saturation and brightness color coordinate system;

a range of predetermined target threshold values of hue corresponding to the pre-determined target masking color hue;

a range of predetermined target threshold values of saturation corresponding to the pre-determined target masking color saturation;

a range of predetermined target threshold values of brightness corresponding to the pre-determined target masking color brightness;

the computer programmed to make transparent areas of the real-time physical environment video images in which the color of the pixels of the real-time physical environment video images fall within the predetermined target threshold values of hue, of saturation and of brightness of the pixels of the target masking color;

the computer adapted to change the virtual video images in response to the input to the computer from the physical object;

the computer programmed to overlay the real-time physical environment video images onto the virtual video images to form combined video images; and, the computer programmed to provide to the image display the combined video images.

7. The system of claim 6 in which the pre-determined target masking color is magenta.

8. The system of claim 6 in which the real-time physical environment is representative of the inside of a vehicle.

9. The system of claim 8 in which the pre-designated area is representative of a window of the vehicle.

10. The system of claim 6 in which the physical object is representative of any of a handle, an accelerator, a steering mechanism or a firing device.

11. The system of claim 6 in which the real-time physical environment is the inside of a helicopter.

12. The system of claim 6 in which the pre-designated area is a flat surface.

13. The system of claim 6 in which the pre-designated area is a shallow dish.

14. The system of claim 6 wherein the camera includes a user-controlled exposure capability.

15. The system of claim 6 wherein the camera includes an automatic exposure capability.

16. The system of claim 6 wherein the pre-designated area is adapted to emit light to keep constant the target masking color in a variety of dynamically changing lighting conditions.

17. The system of claim 6 wherein the computer is programmed to make transparent all areas of the real video images in which the color of the pixels of the real video images match the target color in a variety of dynamically changing lighting conditions.

18. The system of claim 6 in which correspondence between a color in an R, G, B color coordinate system and the same color in a Hue (H), Saturation (S) and Brightness (V) color coordinate system is defined by a formula, in which R, G and B values are between 0.0 and 1.0, MAX equals a maximum value of each of the R, G, B values, respectively, MIN equals a minimum value of each of the R, G, B values, respectively, and $$H = \begin{cases} 60 \times \frac{G-B}{MAX-MIN} + 0, & \text{if } MAX = R \\ 60 \times \frac{B-R}{MAX-MIN} + 120, & \text{if } MAX = G \\ 60 \times \frac{R-G}{MAX-MIN} + 240, & \text{if } MAX = B \end{cases}$$

$$S = \frac{MAX - MIN}{MAX}$$

$$V = MAX.$$

19. The system of claim 6 in which the real-time physical environment is a near-field environment and the virtual reality environment is a far-field environment.

20. The system of claim 19 wherein the computer is adapted to convert the video images of the real-time physical near-field environment and the video images of the virtual reality far-field environment into bitmaps.

* * * * *